(12) United States Patent
Yoshida et al.

(10) Patent No.: US 10,921,656 B2
(45) Date of Patent: Feb. 16, 2021

(54) LIGHT CONTROL MODULE

(71) Applicant: TOPPAN PRINTING CO., LTD., Taito-ku (JP)

(72) Inventors: Tetsushi Yoshida, Taito-ku (JP); Koichi Makidai, Taito-ku (JP); Akiko Nagai, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 31 days.

(21) Appl. No.: 16/152,543

(22) Filed: Oct. 5, 2018

(65) Prior Publication Data

US 2019/0041680 A1 Feb. 7, 2019

Related U.S. Application Data

(63) Continuation of application No. PCT/JP2017/014227, filed on Apr. 5, 2017.

(30) Foreign Application Priority Data

Apr. 5, 2016 (JP) .................................. 2016-076133

(51) Int. Cl.
*G02F 1/1343* (2006.01)
*G02F 1/1334* (2006.01)
(Continued)

(52) U.S. Cl.
CPC ............ *G02F 1/13439* (2013.01); *E06B 9/24* (2013.01); *G02F 1/13* (2013.01); *G02F 1/1334* (2013.01);
(Continued)

(58) Field of Classification Search
CPC ............ G02F 1/13439; G02F 1/13306; G02F 1/1334; G02F 1/1343; G02F 1/1345;
(Continued)

(56) References Cited

U.S. PATENT DOCUMENTS 5,293,546 A * 3/1994 Tadros .................... G02F 1/155
359/266
8,687,263 B2 4/2014 Nomura et al.
(Continued)

FOREIGN PATENT DOCUMENTS

EP 0 417 624 A2 3/1991
JP 62-143032 A 6/1987
(Continued)

OTHER PUBLICATIONS

International Search Report dated Jun. 13, 2017 in PCT/JP2017/014227, filed Apr. 5, 2017, 5 pages.
(Continued)

*Primary Examiner* — Charles S Chang
(74) *Attorney, Agent, or Firm* — Oblon, McClelland, Maier & Neustadt, L.L.P.

(57) ABSTRACT

A light control module including a light control sheet and a drive circuit that applies a voltage to a first electrode and a second electrode of the light control sheet. The light control sheet includes a light control layer switchable between a transparent state and an opaque state according to an applied voltage. The light control sheet has a feeding area for applying a voltage to the first and second electrodes. The light control sheet is formed such that when the light control sheet receives a voltage that causes a transmittance of the light control sheet to be equivalent to a Munsell value of 90% in a region closest to the feeding area, the light control sheet has a transmittance equivalent to a Munsell value of 50% in a region farthest from the feeding area, where a Munsell value of 100% is a maximum transmittance of the light control sheet.

18 Claims, 12 Drawing Sheets

(51) Int. Cl.
- *E06B 9/24* (2006.01)
- *G02F 1/1345* (2006.01)
- *G02F 1/13* (2006.01)
- *G02F 1/133* (2006.01)
- *G02F 1/1333* (2006.01)
- *G02F 1/155* (2006.01)

(52) U.S. Cl.
CPC .......... *G02F 1/1343* (2013.01); *G02F 1/1345* (2013.01); *G02F 1/13306* (2013.01); *G02F 1/133308* (2013.01); *G02F 1/134336* (2013.01); *E06B 2009/2464* (2013.01); *G02F 1/155* (2013.01); *G02F 2001/13324* (2013.01); *G02F 2001/13345* (2013.01)

(58) Field of Classification Search
CPC ................. G02F 1/13; G02F 1/133308; G02F 1/134336; G02F 1/155; G02F 2001/13324; G02F 2001/13345; E06B 9/24; E06B 2009/2464
USPC .......................................................... 349/16
See application file for complete search history.

(56) References Cited

U.S. PATENT DOCUMENTS

| | | | | |
|---|---|---|---|---|
| 2006/0044482 A1* | 3/2006 | Shaftel | .................... | G02F 1/133 349/33 |
| 2006/0098290 A1 | 5/2006 | Fernando et al. | | |
| 2008/0158448 A1* | 7/2008 | Fernando | .................. | E06B 9/24 349/16 |
| 2009/0290078 A1* | 11/2009 | Yang | ................... | G02F 1/13718 349/16 |
| 2014/0177026 A1 | 6/2014 | Tsai et al. | | |
| 2016/0161780 A1* | 6/2016 | Van Oosten | ............ | G02F 1/172 349/16 |
| 2017/0138120 A1* | 5/2017 | Suzuka | ................. | G02F 1/1343 |

FOREIGN PATENT DOCUMENTS

| | | | | |
|---|---|---|---|---|
| JP | 6-93067 B2 | | 11/1994 | |
| JP | 2004-137852 | * | 5/2004 | ............... E06B 9/24 |
| JP | 2004-137852 A | | 5/2004 | |
| JP | 2014-146051 A | | 8/2014 | |
| JP | 2015-151798 A | | 8/2015 | |
| WO | WO 2016/006181 A1 | | 1/2016 | |

OTHER PUBLICATIONS

Korean Office Action dated Sep. 25, 2019, in Patent Application No. 10-2018-7029440, 7 pages (with English translation).

Extended European Search Report dated Oct. 9, 2019 in Patent Application No. 17779174.6, 9 pages.

Office Action dated Dec. 2, 2020 in European Patent Application No. 17 779 174.6.

* cited by examiner

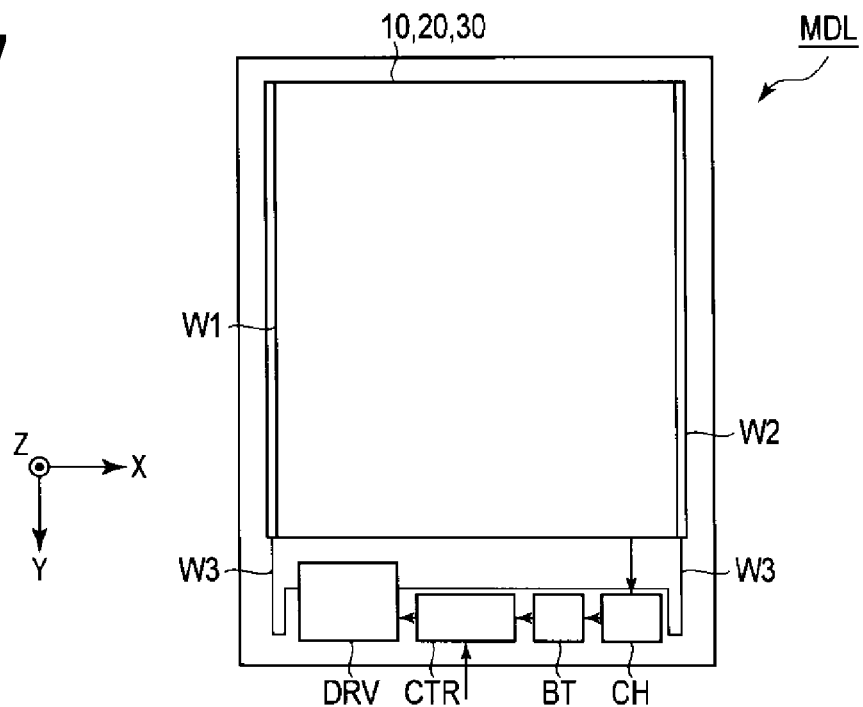
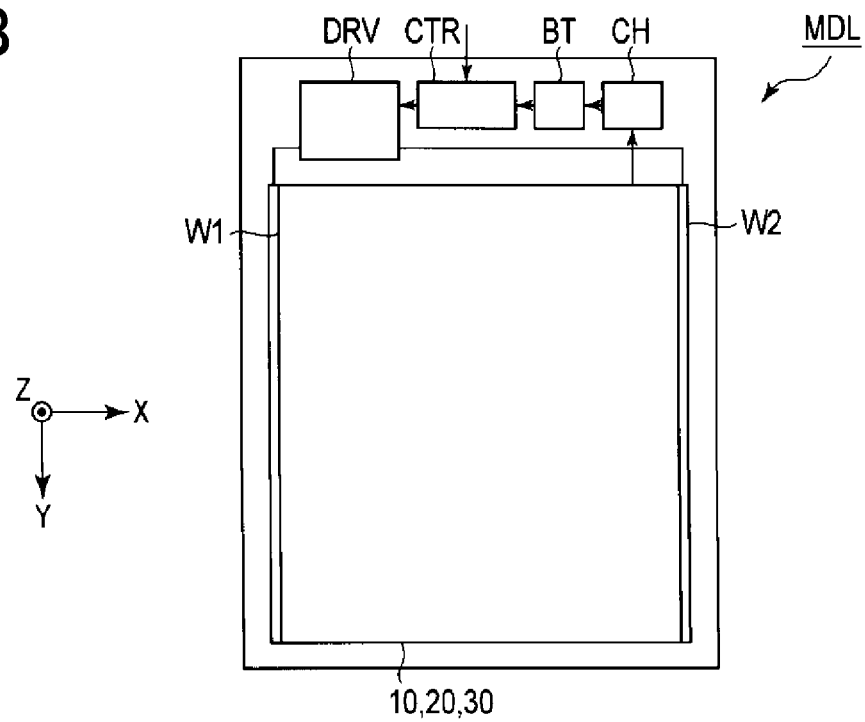

LIGHT CONTROL MODULE

CROSS-REFERENCE TO RELATED APPLICATIONS

The present application is a continuation of International Application No. PCT/JP2017/014227, filed Apr. 5, 2017, which is based upon and claims the benefits of priority to Japanese Application No. 2016-076133, filed Apr. 5, 2016. The entire contents of these applications are incorporated herein by reference.

BACKGROUND OF THE INVENTION

Field of the Invention

The present invention relates to a light control module and, in particular, relates to a light control module including a light control sheet switchable between the opaque state and the transparent state.

Discussion of the Background

The light control sheet switchable between the opaque state (or whitish state) and the transparent state is employed for various uses. For example, the light control sheet is configured to include a liquid crystal layer held between electrodes and be switchable between an opaque state in which incident light is dispersed and a transparent state in which incident light is transmitted, by changing orientation of liquid crystal molecules contained in the liquid crystal layer according to a voltage applied to the electrodes (see, for example, JP 2014-146051 A).

For example, a light control sheet fixed to a transparent substrate made of glass or the like can be employed as window glass, display windows, partitions, or the like. For example, such a light control sheet can be used as equipment for separating a private space and a public space.

Furthermore, power generation window systems have been proposed in which a light control sheet is combined with a solar battery and the light control sheet is driven with electric power from the solar battery (see, for example, JP 2015-151798 A).

SUMMARY OF THE INVENTION

According to an aspect of the present invention, a light control module includes a light control sheet including a light control layer, at least one first electrode, and at least one second electrode facing the at least one first electrode with the light control layer formed therebetween, and a drive circuit that applies a voltage to the at least one first electrode and the at least one second electrode. The light control layer is switchable between a transparent state and an opaque state according to an applied voltage, each of the at least one first electrode and the at least one second electrode includes a transparent conductive material, the light control sheet has a feeding area for applying a voltage to the at least one first electrode and the at least one second electrode, and the light control sheet is formed such that when the light control sheet receives a voltage that causes a transmittance of the light control sheet to be equivalent to a Munsell value of 90% in a region closest to the feeding area, the light control sheet has a transmittance equivalent to a Munsell value of 50% in a region farthest from the feeding area, where a Munsell value of 100% is a maximum transmittance of the light control sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a block diagram schematically illustrating an example of a drive circuit of the light control module according to the first embodiment.

FIG. 8 is a block diagram schematically illustrating another example of the drive circuit of the light control module according to the first embodiment.

DESCRIPTION OF THE EMBODIMENTS

Figure 1:
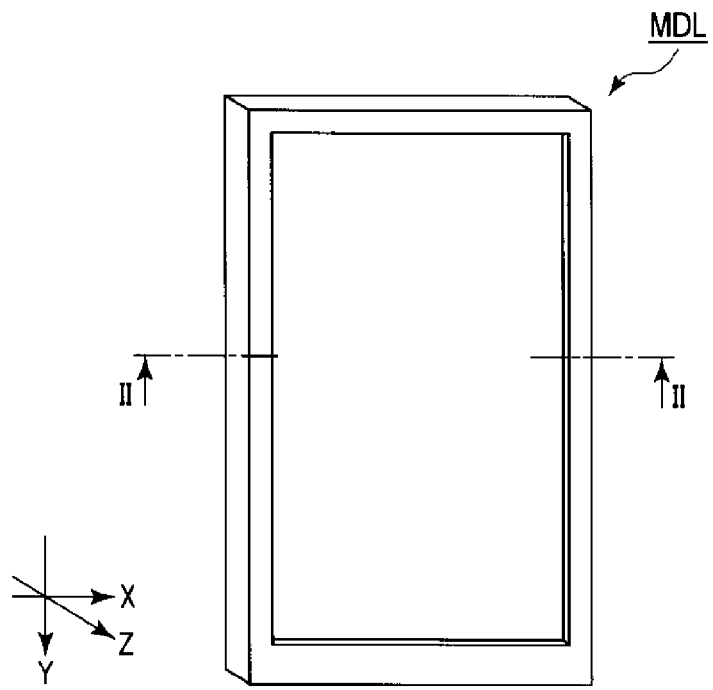
FIG. 1 is a perspective view schematically illustrating an example of a configuration of a light control module according to an embodiment.

The embodiments will now be described with reference to the accompanying drawings, wherein like reference numerals designate corresponding or identical elements throughout the various drawings.

A description will be given of a light control module of a plurality of embodiments with reference to the drawings. Note that the drawings are schematic or conceptual, and dimensions, ratios, and the like in the drawings are not necessarily identical to the actual ones. The dimensions or ratios of the same portion may be indicated to be different in the drawings. In particular, some of the embodiments described below exemplify an apparatus or a method for embodying the technical idea of the present invention, and the technical idea of the present invention is not specified by shapes, structures, arrangements, or the like of the components. In the following description, elements having the same function and configuration are given the same reference signs, and a description is duplicated only when necessary.

FIG. 1 is a perspective view schematically illustrating an example of a configuration of a light control module MDL according to an embodiment.

Figure 2:
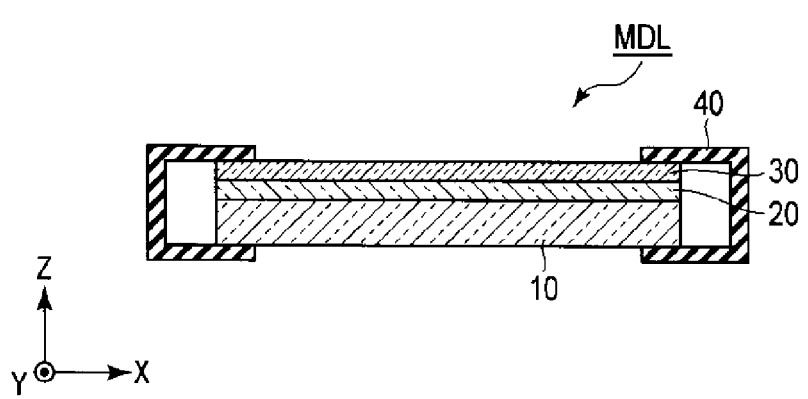
FIG. 2 schematically illustrates an example of a cross section taken along line II-II of the light control module in FIG. 1.

FIG. 2 is a diagram schematically illustrating an example of a cross section taken along line II-II of the light control module MDL in FIG. 1. In the following description, a short side (width) direction, a long side (longitudinal) direction, and a thickness (lamination) direction of the light control module MDL are referred to as first direction X, second direction Y, and third direction Z, respectively.

The light control module MDL of the present embodiment includes a transparent substrate 10, a solar battery 20, a light control sheet 30, and a frame 40. The transparent substrate 10, the solar battery 20, and the light control sheet 30 are laminated in the third direction Z.

For example, the transparent substrate 10 is a transparent insulating substrate made of glass, an acrylic resin, or the like. The transparent substrate 10 supports the solar battery 20 and the light control sheet 30 (described later). It is preferable to employ the transparent substrate 10 having a suitable thickness according to the usage such as construction materials, vehicles, automobiles, aircrafts, or ships. When the light control module is used as a construction material, for example, glass with which the light control module MDL has a thickness of at least 3 mm or more can be used as the transparent substrate 10.

The solar battery 20 is a photoelectric conversion section which converse light energy from sunlight, illumination light, or the like into power energy, and outputs the power energy. The solar battery 20 is a translucent (transparent or semitransparent) photoelectric conversion section laminated on one surface of the transparent substrate 10. The solar battery 20 may be formed directly on the transparent substrate 10. Alternatively, the solar battery 20 formed on a substrate different from the transparent substrate 10 may be laminated on the transparent substrate 10.

The light control sheet 30 is arranged on the solar battery 20. The light control sheet 30 is a film switchable between the transparent state and the scattering state (opaque state) according to an applied voltage. Furthermore, the light control sheet 30 is switchable between the transparent and halftone states and between the scattering and half tone states according to the applied voltage. In the transparent state, the light control sheet 30 is see-through from both sides thereof. In the opaque state, the light control sheet 30 is not see-through from either side thereof.

According to the present embodiment, the light control sheet 30 includes a normal-type light control layer which is in the scattering state when no voltage is applied and switches from the scattering state to the transparent state when an applied voltage is increased. However, the light control sheet 30 is not limited to the configuration including the normal-type light control layer and may include a reverse-type light control layer which is in the transparent state when no voltage is applied and switches from the transparent state to the scattering state when an applied voltage is increased.

For example, the light control sheet 30 includes, as the light control layer, a liquid crystal layer containing a liquid crystal selected from a polymer dispersed liquid crystal (PDLC) and a polymer network liquid crystal (PNLC). The light control layer is arranged between transparent electrodes. A linear transmittance of the light control sheet 30 is controlled with a voltage applied between the transparent electrodes. According to the present embodiment, for example, the light control layer has a thickness of approximately 20 μm.

The liquid crystal layer of the light control sheet 30 is not limited to the above configuration. For example, the light control sheet 30 may include a light control layer composed of an electrochromic material and capable of controlling a transmittance. Alternatively, the light control sheet 30 may include, as the light control layer, a liquid crystal layer composed of a material other than the polymer liquid crystal material. For example, the liquid crystal layer as the light control layer can employ various orientation systems such as a TN system, a VA system, an IPS system, an OCB system, and the like.

The frame 40 surrounds and holds the transparent substrate 10, the solar battery 20, and the light control sheet 30. For example, the frame 40 is configured such that a space is formed between the frame 40 and ends of the transparent substrate 10, the solar battery 20, and the light control sheet 30. In the space inside the frame 40, a circuit board (not illustrated), a storage battery, and the like can be housed.

Figure 3:
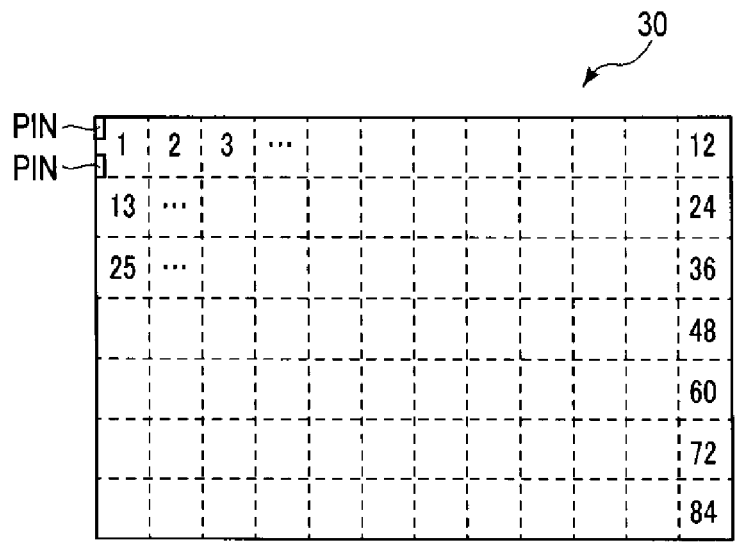
FIG. 3 is a plan view illustrating an example of a configuration of a light control sheet of a light control module according to an embodiment.

FIG. 3 is a plan view illustrating an example of a configuration of a light control sheet of a light control module according to an embodiment. The light control sheet 30 includes a feeding area PIN which applies a voltage to the light control layer. The feeding area PIN is provided close to one corner of the light control sheet 30 having a substantially rectangular shape.

Assume that the light control sheet 30 is constituted by virtual regions "1" to "84" for unit area. The feeding area PIN is provided in the region "1" of the light control sheet 30. Accordingly, the region closest to the feeding area PIN is the region "1", and the region farthest from the feeding area PIN is the region "84".

The light control layer of the light control sheet 30 is arranged between the transparent electrodes and is switched between the transparent state and the scattering state according to a voltage applied to the transparent electrodes via the feeding area PIN. When the light control sheet 30 increases in size, in a region of the light control sheet 30 far from the feeding area PIN, the resistance of the transparent electrodes causes a voltage drop, and this voltage drop reduces the effective voltage applied to the light control layer. If an effective voltage difference between a position close to the feeding area PIN and a position far therefrom becomes larger, regions of the light control sheet 30 closer to the feeding area PIN are transparent and regions of the light control sheet 30 farther from the feeding area PIN are opaque.

According to the present embodiment, therefore, in order to minimize a gradient in linear transmittance (maximum voltage gradient) in a plane direction (X-Y direction) of the light control sheet 30 and ensure uniformity in transmittance (reduce recognition of nonuniformity in transmittance), a difference between a voltage (effective voltage) applied to the light control layer in a unit-area region close to a feeding position and a voltage (effective voltage) applied to the light control layer in a unit-area region far from the feeding position is set to a predetermined value or less.

The following discussion will examine an acceptable range for a difference in the voltage applied to the light control layer between a region of the light control sheet 30 close to the feeding area PIN and a region of the light control sheet 30 far from the feeding area PIN.

Figure 4:
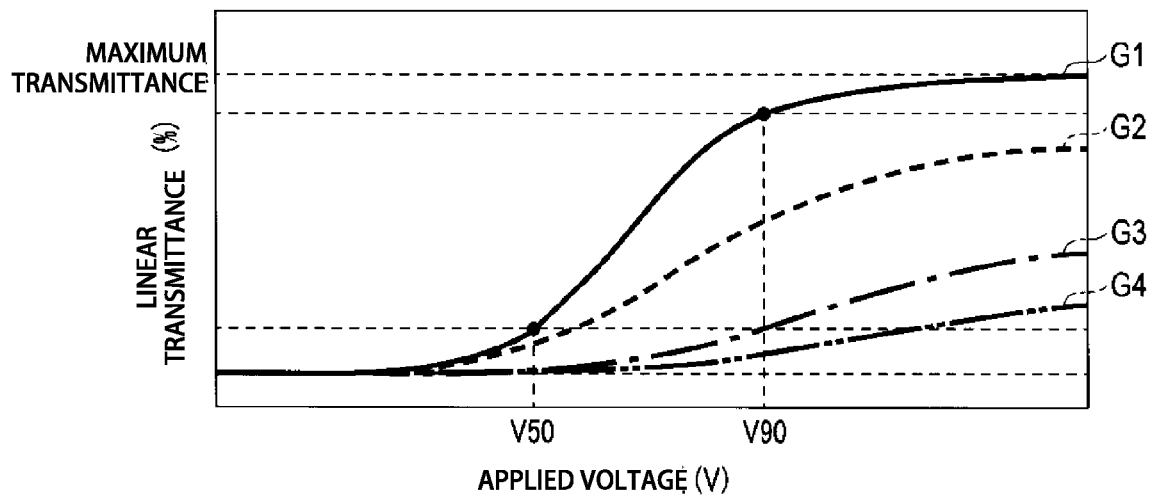
FIG. 4 explains an example of a configuration of a light control module according to an embodiment.

FIG. 4 explains an example of a configuration of a light control module according to an embodiment. In FIG. 4, graph G1 in a solid line shows an example of a relationship between an applied voltage and a linear transmittance of the light control module MDL corresponding to a region of the light control sheet 30 close to the feeding area PIN (e.g., region "1" in FIG. 3). The relationship between an applied voltage and a transmittance of the light control module MDL has substantially the same characteristics as a relationship between an applied voltage and a transmittance of the light control sheet 30.

In the example shown in FIG. 4, a saturated transmittance (maximum transmittance) when the linear transmittance of the light control module MDL becomes saturated is 67%. A minimum transmittance, with which a person recognizes the light control sheet to be opaque, is 0%. When an entire surface of the light control sheet 30 is to be in the transparent state, a luminance gradient between the region close to the feeding area PIN and the region farthest therefrom is preferably small. For example, when the light control sheet 30 is switched between two tones, i.e., the transparent state and the opaque state, if, for example, in a portion of the light control module MDL corresponding to the region farthest from the feeding area PIN, a transmittance is less than a transmittance of a Munsell value of 50%, in some cases, the tone can be recognized to be different as compared with that in the region close to the feeding area PIN. However, when a high voltage is applied to the feeding area PIN in order to obtain a sufficient transmittance in the portion of the light control module MDL corresponding to the region farthest from the feeding area PIN, it has been difficult to keep power consumption of the light control sheet 30 low.

Thus, the inventors of the present application have examined, in the light control module MDL of the present embodiment, an acceptable range for a voltage difference in effective voltage applied to the light control layer between the region close to the feeding area PIN and the region farthest from the feeding area PIN.

For example, when a person visually recognized a smooth change from a Munsell value of 90% to a Munsell value of 50% in luminance of a surface, the luminance was recognizable as being uniform. Human eyes are more sensitive to relative brightness than to absolute brightness. Thus, in a relative change in luminance equivalent to the smooth change in luminance from a Munsell value of 90% to a Munsell value of 50%, the luminance is similarly recognized to be uniform.

A Munsell value of 90% is equivalent to a transmittance of 78%, and a Munsell value of 50% is equivalent to a transmittance of 19.8%. In this case, assume that a Munsell value of 100% corresponds to a maximum transmittance of 67% of the light control sheet 30, and a Munsell value of 0% corresponds to a minimum transmittance of 0%, with which a person recognizes the light control sheet to be opaque. On this assumption, in the light control sheet 30, for a change from transmittance equivalent to the Munsell value of 90% to transmittance equivalent to the Munsell value of 50%, the entire surface is recognizable as being in the transparent state.

Note that the Munsell value of 90% is equivalent to a linear transmittance of 52.729% (=67×0.787). According to the graph in FIG. 4, when the linear transmittance in a portion of the light control module MDL corresponding to the region close to the feeding area PIN is 52.729%, an applied voltage V90 is approximately 11.3 V.

Furthermore, the Munsell value of 50% is equivalent to a linear transmittance of 13.266% (=67×0.198). According to the graph in FIG. 4, when the linear transmittance in the portion of the light control module MDL in the region close to the feeding area PIN is 13.266%, an applied voltage V50 is approximately 6.7 V.

This result shows that when the entire surface of the light control sheet 30 is in the transparent state, an acceptable voltage difference in effective voltage between the region close to the feeding area PIN and the region farthest from the feeding area PIN is 4.6 V (=11.3 V−6.7 V). Specifically, when a difference in the voltage applied to the light control layer between the region close to the feeding area PIN and the region farthest from the feeding area PIN is 4.6 V or less, the luminance is recognized to be uniform over the entire surface of the light control sheet 30.

In FIG. 4, in ascending order of a distance from the feeding area PIN, graphs G2, G3, and G4 in dashed lines show linear transmittances of respective regions of the light control module MDL relative to a voltage applied to the feeding area PIN.

When the applied voltage V90 was supplied to the feeding area PIN so that a transmittance equivalent to a Munsell value of 90% was obtained in a portion of the light control module MDL corresponding to the region closest to the feeding area PIN, in graph G2, a transmittance higher than a transmittance equivalent to a Munsell value of 50% was obtained, in graph G3, the same transmittance as a transmittance equivalent to a Munsell of 50% value was obtained, and in graph G4, a transmittance lower than a transmittance equivalent to a Munsell value of 50% was obtained.

For example, when characteristics of the linear transmittance relative to the applied voltage were as shown by graph G1 in a portion of the light control module MDL corresponding to the region "1" of the light control sheet 30 in FIG. 3 and were as shown by graphs G2 and G3 in a portion of the light control module MDL corresponding to the region "84" of the light control sheet 30, the luminance was recognizable as being uniform over the entire surface of the light control sheet 30 and the light control module MDL.

However, when the characteristics of the linear transmittance relative to the applied voltage were as shown by graph G1 in the portion of the light control module MDL corresponding to the region "1" of the light control sheet 30 in FIG. 3 and were as shown by graph G4 in the portion of the light control module MDL corresponding to the region "84" of the light control sheet 30, the luminance in the portions corresponding to the respective regions "1" and "84" were recognized to be different gradations.

That is, when the maximum transmittance of the light control module MDL is equivalent to a Munsell value of 100%, and a voltage is applied so that a transmittance equivalent to a Munsell value of 90% is obtained in the portion of the light control module MDL corresponding to the region of the light control sheet 30 closest to the feeding area PIN applying a voltage to the light control layer, if a transmittance in the portion of the light control module MDL corresponding to the region of the light control sheet 30 farthest from the feeding area PIN is not more than a transmittance equivalent to a Munsell value of 50%, the region having a highest transmittance and the region having a lowest transmittance are recognized to have different gradations, and thus the light control sheet 30 is recognized to be nonuniform in transmittance.

Thus, when the maximum transmittance of the light control module MDL is equivalent to a Munsell value of 100%, and a voltage is applied so that a transmittance equivalent to a Munsell value of 90% is obtained in the portion of the light control module MDL corresponding to the region of the light control sheet 30 closest to the feeding area PIN applying a voltage to the light control layer, if a transmittance higher than a transmittance equivalent to a Munsell value of 50% is obtained in the portion of the light control module MDL corresponding to the region of the light control sheet 30 farthest from the feeding area PIN, the luminance is recognized to be uniform over the entire surface of the light control sheet 30.

Furthermore, the inventors of the present application virtually divided the light control sheet 30 into a plurality of regions according to a distance from the feeding area PIN, obtained n graphs G1, G2, G3, . . . , and Gn of a linear transmittance relative to an applied voltage in the relative regions in ascending order of a distance from the feeding area PIN, and examined a boundary at which the regions were visually recognized to have different tones. As a result, the inventors have found that when the luminance at the maximum linear transmittance of the light control sheet 30 is a Munsell value of 100%, and V90 is a voltage with which a transmittance equivalent to a Munsell value of 90% is obtained and V50 is a voltage with which a transmittance equivalent to a Munsell value of 50% is obtained in the region closest to the feeding area PIN, if a transmittance corresponding to V90 in graph Gk (k<n) is not less than a transmittance corresponding to V50 in graph G1, a voltage drop between the region close to the feeding area PIN and a k-th closest region to the feeding area PIN is small, and thus a transmittance difference (luminance gradient) of the light control sheet 30 is not recognized. In other words, the inventors of the present application have found that in a region farther from the feeding area PIN than the k-th region is, the transmittance difference (luminance gradient) of the light control sheet 30 is recognized.

The light control sheet 30 has a width (X direction) of 750 mm and a height (Y direction) of 1700 mm, and in the vicinity of an intersection of a short side and a long side, the light control sheet 30 includes the feeding area PIN of 350 mm extending along the short side. The transparent substrate 10 is made of glass, and a sheet resistance in a region which is 1600 mm far from the feeding area PIN is approximately 4.267 R (=R×(1600/375)). The transparent electrode which applies a voltage to the light control layer of the light control sheet 30 is made of ITO. The ITO has a sheet resistance R (Ω/□) of approximately 100 (Ω) or more and 300 (Ω) or less. Accordingly, an electrode resistance in the region farthest from the feeding area PIN is approximately in the range of 427 (Ω) to 1280 (Ω). Thus, a difference of approximately 4.3 times in resistance value occurs between the region close to the feeding area PIN and the region farthest from the feeding area PIN, and this difference in resistance value presumably results in a drop in voltage applied from the feeding area PIN at the position far from the feeding area PIN.

According to the light control module of the above embodiment, the transmittance of the light control sheet 30 is recognized to be uniform, and the light control module can be driven at a low voltage.

With reference to the drawings, a detailed description will be given of a plurality of embodiments of the light control module MDL according to the embodiment described above.

First Embodiment

Figure 5:
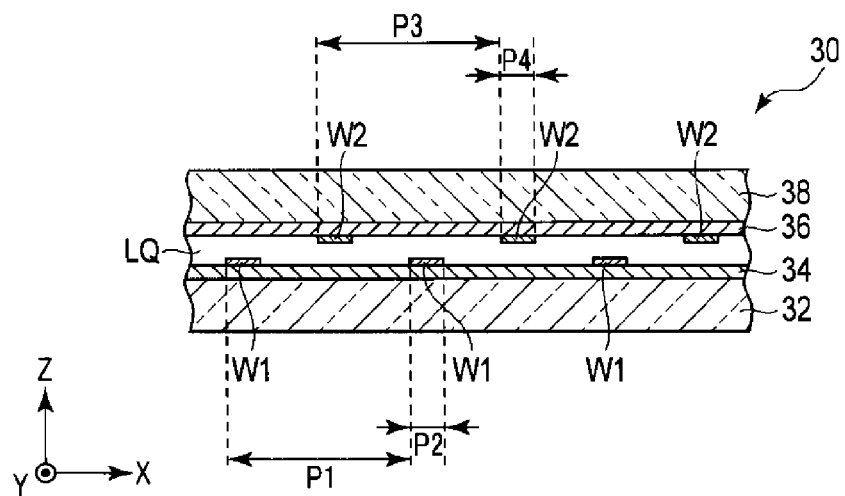
FIG. 5 is a cross-sectional view illustrating an example configuration of electrodes of a light control module according to a first embodiment.

FIG. 5 is a cross-sectional view schematically illustrating a configuration of a light control sheet of the light control module MDL according to the first embodiment.

The light control sheet 30 of the present embodiment includes a first substrate 32, a first electrode 34, a first wire W1, a liquid crystal layer LQ, a second wire W2, a second electrode 36, and a second substrate 38.

The first substrate 32 is a transparent insulating substrate which supports the first electrode 34. For example, the first substrate 32 is a film made of polyethylene terephthalate (PET). According to the present embodiment, the first substrate 32 is a PET film having a thickness of approximately 50 μm. In consideration of a thickness and strength of the light control sheet 30, for example, the first substrate 32 preferably has a thickness of 50 μm or more and 200 μm or less.

The first electrode 34 is formed on the first substrate 32. For example, the first electrode 34 is a transparent electrode made of a transparent conductive material such as an organic conductive material (e.g., ITO or IZO) or a conductive polymer material (e.g., PEDOT or PEDOT/PSS), and has a thickness of approximately 80 nm or more and 150 nm or less. The first electrode 34 is formed over almost an entire surface on a liquid crystal layer LQ side of the first substrate 32.

The first wire W1 is arranged to form a predetermined pattern (described later) on the first electrode 34. The first wire W1 is a wire made of a material whose electrical resistance is lower than that of at least the first electrode 34. According to the present embodiment, for example, the first wire W1 is a copper wire. A wire made of a material, such as copper, aluminum, or silver, whose electrical resistance is lower than that of the first electrode 34 can be used as the first wire W1.

When metal is used as a material to form the first wire W1 and the second wire W2 (described later), although a metal thin line has a lower resistance value than an electrode (including the first electrode 34 and the second electrode 36) made of a transparent conductive oxide, the metal thin line is easily visually recognized due to light reflection typical of metal, and a pattern formed by the metal thin line is easily seen. Accordingly, in a light control module including a wire made of metal, it is preferable to make it difficult to visually recognize the wire by reducing surface reflection of the wire.

For example, when the first wire W1 and the second wire W2 are made of copper (Cu), after a copper wire is formed, coating may be formed on a surface of the copper wire by wet processing using various chemicals so that the copper wire takes on a dark color hue such as black, blue, or green.

As the first wire W1 and the second wire W2, instead of forming a monolayer copper wire, it is effective to form, at least above or below a copper layer, a copper oxynitride layer (CuNO) whose reflectance is lower than that of the copper layer. When producing a laminate including a copper oxynitride layer, a technique is employed in which a first copper oxynitride layer, a copper layer, and a second copper oxynitride layer are sequentially formed on a substrate surface by a sputtering method.

The copper layer needs to have a thickness of 0.2µ or more. The thickness of the first and second copper oxynitride layers is preferably 30 nm or more and 50 nm or less and 25% or less of the thickness of the copper layer. The first copper oxynitride layer having a thickness of 30 nm or more and 50 nm or less has a sufficient thickness to improve adhesion between the substrate and the copper layer. Furthermore, the first copper oxynitride layer having a thickness of 25% or less of the thickness of the copper layer prevents excessive increases in the thickness in the whole wire layer and the amount of copper used, while maintaining adhesion between the substrate and the copper layer.

The copper oxynitride layer (CuNO) formed by the sputtering method is advantageous for the following reason. That is, although copper nitride (CuN) is chemically unstable, easily reacts with oxygen in air, and greatly changes in optical characteristics (hue) after film forming, the copper oxynitride layer formed by sputtering film forming in which amounts of assist gas of N and O are controlled is easily stabilized in optical characteristics after film forming, and thus such a copper oxynitride layer is advantageous for obtaining a composition having a desired hue.

In order to reduce visual recognizability by reducing surface reflection, with regard to a reflectance and a hue of the copper oxynitride layer (CuNO), among tristimulus values of the XYZ color system according to JIS Z 8722, a value of Y is preferably 20% or less, and in the Lab color system, $L^*$ is preferably 55 or less and $a^*$ and $b^*$ preferably have negative values.

The first wire W1 and the second wire W2 are arranged, with a laminate of silver paste and carbon as a primary layer, on a transparent conductive oxide. The silver paste of the primary layer improves adhesion between the transparent conductive oxide and the copper wire. The carbon of the primary layer flattens asperities on a surface of the silver paste and is interposed between the silver paste and the copper wire. Thus, the first wire W1 and the second wire W2 are fixed at predetermined positions on the transparent conductive oxide.

A pitch P1 of the first wire W1 in the first direction X is preferably 2.85 mm or less. A width P2 of the first wire W1 is preferably sufficiently small enough not to be visually recognized. For example, when the width P2 of the first wire W1 was 20 µm or less, the first wire W1 was not visually recognized from a position 2 m away. For example, the transparent electrode of the light control sheet 30 has a short side of 100 mm, a long side of 1000 mm, and a resistance value of approximately 1200Ω. When 35 copper wires extending in the long side direction and having a width of 20 µm are arranged in a width (short side direction) of 100 mm, the first wire W1 arranged on the transparent electrode can have a resistance value of 12Ω, which is one hundredth of the resistance value of the transparent electrode. In this case, a pitch of the copper wires is 2.85 mm.

The liquid crystal layer LQ is a light control layer which is switchable between the transparent state and the opaque state according to an applied voltage. The liquid crystal layer LQ is composed of a polymer dispersed liquid crystal (PDLC) or a polymer network liquid crystal (PNLC). The PNLC is composed such that a liquid crystal material is dispersed in a polymer network, and the liquid crystal material in the polymer network has a continuous phase. The PDLC is composed such that liquid crystals are dispersed by a polymer, specifically, the liquid crystals are phase-separated in the polymer. A photo-curable resin can be used as the polymer layer. For example, in the PNLC, a solution in which a liquid crystal material is mixed with a photopolymerizable polymer precursor (monomer) is irradiated with ultraviolet light, the monomer is polymerized to form a polymer, and the liquid crystal material is dispersed in a network of the polymer. A positive-type (P-type) nematic liquid crystal is used as the liquid crystal material for the liquid crystal layer LQ. That is, when no voltage (no electric field) is applied, long axes (directors) of liquid crystal molecules are randomly orientated, and when a voltage (an electric field) is applied, the directors of the liquid crystal molecules are substantially vertically orientated relative to a base plate surface.

Specifically, the liquid crystal layer LQ is a light control layer which is in the opaque state when no voltage is applied and is in the transparent state when a voltage is applied. For example, the liquid crystal layer LQ is sealed using a sealant (not illustrated) which bonds the first substrate 32 to the second substrate 38.

The second substrate 38 is a transparent insulating substrate which supports the second electrode 36. For example, the second substrate 38 is a film made of polyethylene terephthalate (PET). According to the present embodiment, the second substrate 38 is a PET film having a thickness of approximately 50 µm. In consideration of a thickness and strength of the light control sheet 30, for example, the second substrate 38 preferably has a thickness of 50 µm or more and 200 µm or less. When the liquid crystal layer LQ has a thickness of approximately 20 µm, the light control module MDL has a thickness of approximately 120 µm or more and 420 µm or less. The first substrate 32 and the second substrate 38 are a pair of substrates sandwiching the liquid crystal layer LQ, which is the light control layer.

The second electrode 36 is formed on the second substrate 38 and is arranged so as to face the first electrode 34. For example, the second electrode 36 is a transparent electrode made of a transparent conductive material such as an organic conductive material (e.g., ITO or IZO) or a conductive polymer material (e.g., PEDOT or PEDOT/PSS), and has a thickness of approximately 80 nm or more and 150 nm or less. The second electrode 36 is formed over almost an entire surface on a liquid crystal layer LQ side of the second substrate 38.

The second wire W2 is arranged to form a predetermined pattern (described later) on the second electrode 36. The second wire W2 is a wire made of a material whose electrical resistance is lower than that of at least the second electrode 36. According to the present embodiment, for example, the second wire W2 is a copper wire. A wire made of a material, such as copper, aluminum, or silver, whose electrical resistance is lower than that of the second electrode 36 can be used as the second wire W2.

As with the pitch P1 of the first wire W1, a pitch P3 of the second wire W2 in the first direction X is preferably 2.85 mm or less. A width P4 of the second wire W2 is preferably sufficiently small enough not to be visually recognized. For example, when the width P4 of the second wire W2 was 20 µm or less, the second wire W2 was not visually recognized from a position 2 m away.

The first wire W1 and the second wire W2 include wire sections (first wire sections and third wire section described later) extending in a depth direction (second direction Y) in FIG. 5 and are arranged adjacent to each other with a predetermined pitch in a width direction (first direction X) in FIG. 5. In an example illustrated in FIG. 5, the first wire W1 is arranged so as to face a position on the second electrode 36 at which the second wire W2 is not arranged, and the second wire W2 is arranged so as to face a position on the first electrode 34 at which the first wire W1 is not arranged. Although the first wire W1 and the second wire W2 may be arranged so as to face each other, by arranging the first wire W1 so as to face a position at which the second wire W2 is not arranged, it is possible to avoid variations in transmittance when the first wire W1 and the second wire W2 are formed at deviated positions and avoid deterioration in quality of the light control sheet due to moire or the like.

Figure 6:
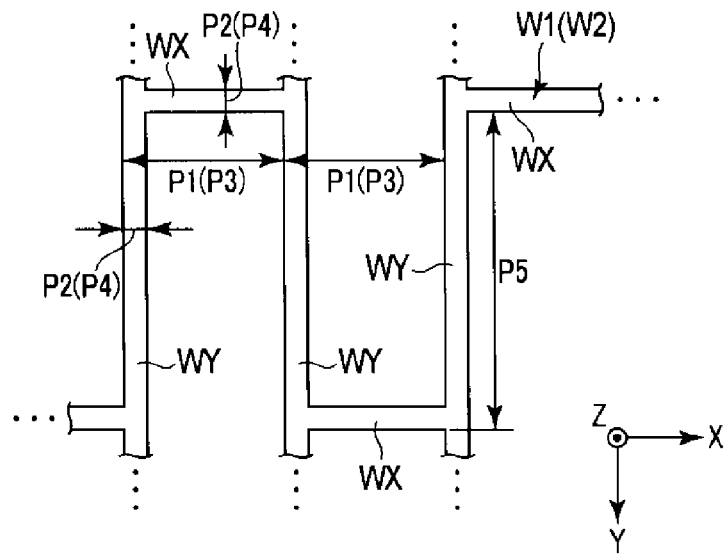
FIG. 6 illustrates an example configuration of a first wire and a second wire of a light control sheet in FIG. 5.

FIG. 6 explains an example configuration of the first wire W1 and the second wire W2 of the light control sheet 30 of the light control module MDL of the first embodiment. According to the present embodiment, the first wire W1 and the second wire W2 form the same pattern, and FIG. 6 illustrates the pattern that the first wire W1 and the second wire W2 form in common.

The first wire W1 has a plurality of first wire sections WY extending in the second direction Y and a plurality of second wire sections WX extending in the first direction X between the first wire sections WY. The second wire W2 has a plurality of third wire sections WY extending in the second direction Y and a plurality of fourth wire sections WX extending in the first direction X between the third wire sections WY.

The second wire sections WX adjacent to each other in the first direction X are arranged at different positions in the second direction Y. A pitch P5 between the second wire sections WX is approximately 1100 μm. The first wire sections WY are electrically connected to each other via the second wire sections WX. In other words, the first wire W1 and the second wire W2 are a conductive film having a mesh shape.

For example, according to the light control sheet 30 in which the first wire W1 and the second wire W2 are arranged to have a mesh shape in the second direction Y as mentioned above, for example, even when the light control sheet taken up in a roll in the second direction Y is cut at any position, the cut piece includes the metal wire (the first wire W1 and the second wire W2), and thus a lower resistance effect is maintained.

As described above, in the first wire W1 and the second wire W2, the wire widths P2 and P4 are preferably 20 μm or less, and the pitches P1 and P3 between the first wire sections WY are preferably 2.85 mm or less.

The following discussion will examine, for example, a case where a plurality of copper wires extending in the long side direction are formed with a pitch of 0.3 mm on an ITO electrode having a short side of 10 mm and a long side of 1000 mm. The ITO has a sheet resistance of approximately 100Ω. Copper has a resistivity of $1.68 \times 10^{-8}$ Ωm. In this case, approximately 33 (10 mm÷0.3 mm≈33) copper wires are arranged on the ITO electrode.

Under the above condition, the ITO electrode has a resistance value of 10,000Ω ($R_{ITO1m}$=100 Ω×1000 mm/10 mm=10,000Ω).

Each of the copper wires has a resistance value $R_{Cu1m}$ as below.

$$R_{Cu1m}/\text{each copper wire}=1.68\times10^{-8}\ \Omega\text{m}\times(\tfrac{1}{4}\times 10^{-11})=420\ \Omega$$

$$R_{Cu1m}=420\ \Omega\div33=12.7\ \Omega$$

Under the above condition, a ratio of the resistance value $R_{ITO1m}$ of the ITO electrode to the resistance value $R_{Cu1m}$ of the copper wire is $R_{ITO1m}:R_{Cu1m}=1,000:1.27=787:1$.

That is, under the above condition, the resistance value of the copper wire is sufficiently smaller than the resistance value of the ITO electrode. Accordingly, the arrangement of the copper wires on the ITO electrode can reduce a voltage gradient which occurs according to a distance from a feeding position when a voltage is applied to the ITO electrode and the copper wires.

FIG. 7 is a block diagram schematically illustrating an example of a drive circuit of the light control module MDL according to the first embodiment.

The light control module MDL of the present embodiment includes a controller CTR, a drive circuit DRV, a storage battery BT, and a charge/discharge circuit CH. The controller CTR, the drive circuit DRV, the storage battery BT, and the charge/discharge circuit CH are housed in a space inside the frame 40 of the light control module MDL.

For example, the controller CTR is an arithmetic circuit including a processor (not illustrated), such as a CPU or MPU, and a memory (not illustrated). The controller CTR can communicate with external devices, receive detection values from various sensors or command values from interfaces such as user-operable remote controls, and control the drive circuit DRV based on the received values.

The charge/discharge circuit CH charges the storage battery with an electric current outputted from the solar battery 20 and supplies a DC voltage from the storage battery to the drive circuit. For example, the charge/discharge circuit CH controls a charging current of the storage battery BT according to a voltage or the like of the storage battery BT. Furthermore, based on a control signal from the control circuit CTR, the charge/discharge circuit CH discharges the storage battery BT and supplies a DC voltage to the drive circuit DRV. The charge/discharge circuit CH may be configured such that when the storage battery BT is fully charged, an output voltage of the solar battery 20 is outputted to the drive circuit DRV.

The drive circuit DRV includes a boost circuit, a frequency oscillator, and a switching circuit. The boost circuit boosts a voltage supplied from the storage battery BT according to a drive voltage of the light control sheet 30. The drive voltage of the light control sheet 30 is set by commands from the control circuit CTR. The frequency oscillator generates a frequency of the drive voltage of the light control sheet 30. The frequency of the drive voltage of the light control sheet 30 is set by commands from the control circuit CTR. The operation of the switching circuit is controlled by the control circuit CTR so that the light control sheet 30 is switched between a drive state and a stop state.

A feeding wire W3 is connected between the drive circuit DRV and each of the first wire W1 and the second wire W2. The feeding wire W3 is made of a material whose electrical resistance is lower than that of the first electrode 34 and the second electrode 36. For example, the feeding wire W3 is a metal wire made of copper, silver, or the like.

When the light control module is used as window glass, it is necessary to avoid an adverse influence of water caused by condensation or the like on the operation of the drive circuit DRV and the control circuit CTR. According to the present embodiment, therefore, the feeding wire W3 is bent so that no water droplets enter the circuits through the feeding wire W3. Specifically, the feeding wire W3 extends from the first wire W1 and the second wire W2 toward a lower side of the frame 40 (an outer edge side of the frame 40), is bent in a substantially U-shape, which is convex downward, and is then electrically connected to the drive circuit DRV. For example, the substantially U-shaped bent portion has a width of 10 mm or more in the Y direction of the feeding wire W3 and a width of 5 mm or more in the X direction of the feeding wire W3.

For example, the drive circuit DRV, the control circuit CTR, the storage battery BT, and the charge/discharge circuit CH are preferably installed with a spacing of 5 mm or more from a base of the frame 40. Thus, even when water is accumulated inside the frame 40, the drive circuit DRV and the like do not immediately become wet, and breakdown of the light control module MDL can be avoided.

FIG. 8 is a block diagram schematically illustrating another example of the drive circuit of the light control module according to the first embodiment.

In the example illustrated in FIG. 8, the drive circuit DRV, the control circuit CTR, the storage battery BT, and the charge/storage circuit CH are arranged, on an upper side of the solar battery 20 and the light control sheet 30, inside the frame 40. In this example, since the drive circuit DRV, the control circuit CTR, the storage battery BT, and the charge/storage circuit CH are installed at the upper portion of the frame, it is possible to prevent water caused by condensation or the like from entering through the feeding wire W3. Accordingly, the feeding wire W3 does not need to be bent, and thus the feeding wire W3 can have a shorter wire length.

In the light control module MDL of the present embodiment, when a voltage achieving a linear transmittance (52.729%) equivalent to a Munsell value of 90% in the region close to the feeding position was applied so that the entire surface was in the transparent state, a voltage applied to the light control layer (liquid crystal layer LQ) in the region farthest from the feeding position was approximately equal to a voltage applied to the light control layer in the region close to the feeding position. Specifically, according to the light control module MDL of the present embodiment, a difference in the voltage applied to the light control layer (liquid crystal layer LQ) between the region close to the feeding position and the region farthest from the feeding position was 4.6 V or less, and the luminance was recognized to be uniform over the entire surface of the light control sheet 30. Furthermore, when the maximum transmittance of the light control module MDL was equivalent to a Munsell value of 100%, and a voltage was applied so that a transmittance equivalent to a Munsell value of 90% was obtained in the portion of the light control module MDL corresponding to the region of the light control sheet 30 closest to the feeding area applying a voltage to the light control layer, a transmittance higher than a transmittance equivalent to a Munsell value of 50% was obtained in the portion of the light control module MDL corresponding to the region of the light control sheet 30 farthest from the feeding area, and the luminance was recognized to be uniform over the entire surface of the light control sheet 30.

As described above, according to the light control module MDL of the present embodiment, the transmittance of the light control sheet 30 is recognized to be uniform, and the drive voltage of the light control sheet 30 can be kept low, and thus lower power consumption of the light control module MDL is achieved. That is, the present embodiment makes it possible to provide a light control module MDL which can be driven at a low voltage.

Furthermore, the light control module MDL of the present embodiment integrally includes the solar battery 20 and a storage battery unit BT so that the light control module MDL can be driven with electric power supplied from these components. Accordingly, the light control module MDL of the present embodiment can be installed at a movable portion or a portion in which wiring is difficult. The light control module MDL of the present embodiment does not need to be fixed in real estate such as an architectural structure, and thus the light control module MDL is easily replaced when the operating life expires.

Example 1

A description will be given of an example of the light control module MDL of the first embodiment described above.

For example, the light control module MDL of the present example was a light control module used for a common home-use aluminum sash sliding door, and the external dimensions of the frame 40 were approximately 810 mm in width (short side) and approximately 900 mm in height (long side) (half of 1620 mm in width and 1800 mm in height). In this case, dimensions of the solar battery 20 and the light control sheet 30 were approximately 750 mm in width and approximately 1700 mm in height.

The first electrode 34 and the second electrode 36 of the light control sheet 30 were made of ITO having a predetermined thickness. The first wire W1 and the second wire W2 had a thickness of 2 µm, the wire widths P2 and P4 were 20 µm, the wire pitches P1 and P3 were 300 µm, and the wire pitch P5 was 1100 µm. The liquid crystal layer LQ was composed of PNLC.

In the light control module MDL of the present example, when a voltage achieving a linear transmittance (52.729%) equivalent to a Munsell value of 90% in the region close to the feeding position was applied so that the entire surface was in the transparent state, a voltage applied to the light control layer (liquid crystal layer LQ) in the region farthest from the feeding position was approximately equal to a voltage applied to the light control layer in the region close to the feeding position. Specifically, according to the light control module MDL of the present example, a difference in the voltage applied to the light control layer (liquid crystal layer LQ) between the region close to the feeding position and the region farthest from the feeding position was 4.6 V or less, and the luminance was recognized to be uniform over the entire surface of the light control sheet 30. Furthermore, when the maximum transmittance of the light control module MDL was equivalent to a Munsell value of 100%, and a voltage was applied so that a transmittance equivalent to a Munsell value of 90% was obtained in the portion of the light control module MDL corresponding to the region of the light control sheet 30 closest to the feeding area applying a voltage to the light control layer, a transmittance higher than a transmittance equivalent to a Munsell value of 50% was obtained in the portion of the light control module MDL corresponding to the region of the light control sheet 30 farthest from the feeding area, and the luminance was recognized to be uniform over the entire surface of the light control sheet 30.

As described above, according to the light control module MDL of the present example, the drive voltage of the light control sheet 30 can be kept low, and thus an effect similar to that of the light control module MDL of the first embodiment is yielded.

Second Embodiment

Figure 9:
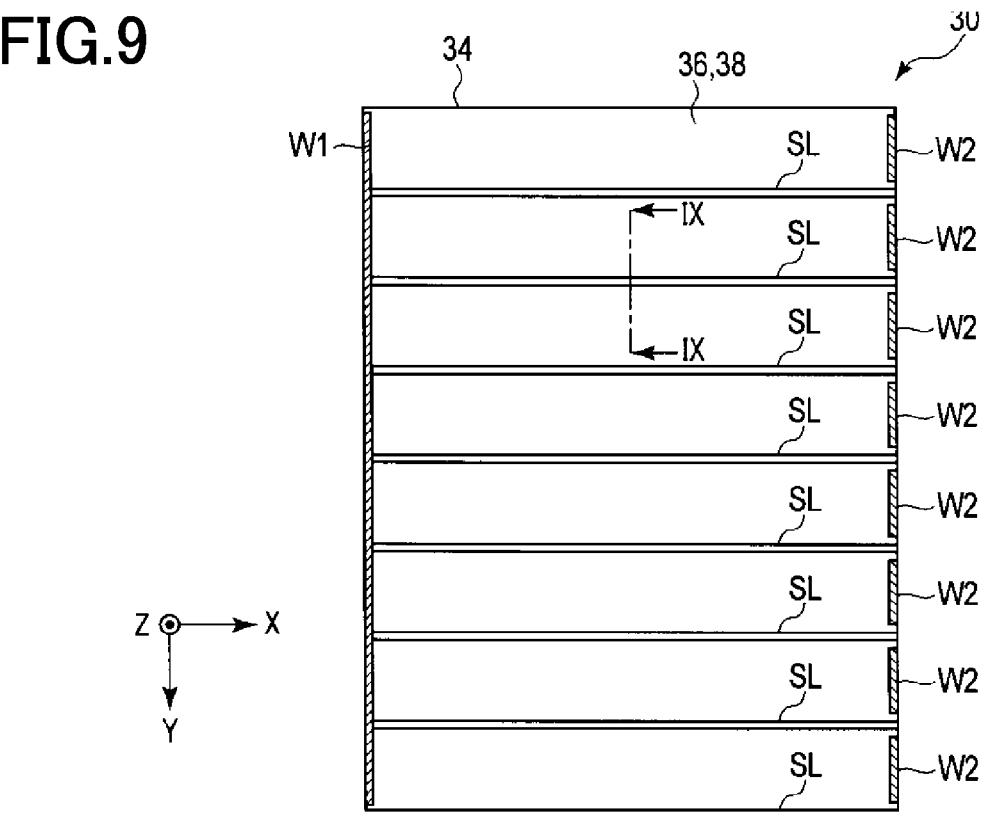
FIG. 9 is a plan view schematically illustrating an example of a configuration of a light control sheet of a light control module according to a second embodiment.

FIG. 9 is a plan view schematically illustrating an example of a configuration of the light control sheet of the light control module MDL according to the second embodiment.

Figure 10:
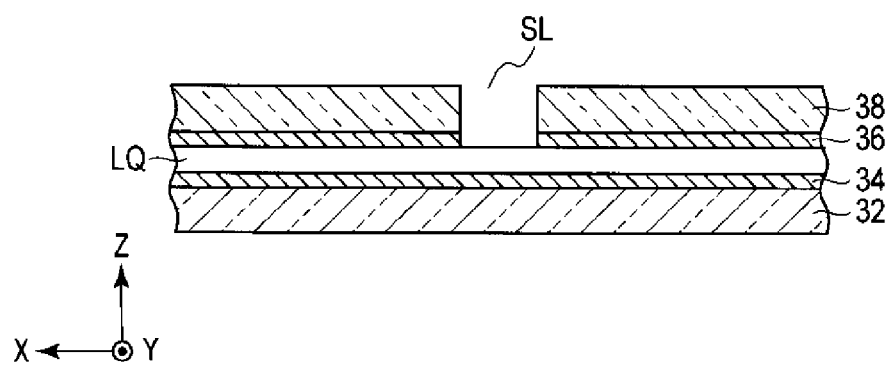
FIG. 10 schematically illustrates an example of a cross section taken along line IX-IX of the light control sheet in FIG. 9.

FIG. 10 is a diagram schematically illustrating an example of a cross section taken along line IX-IX of the light control sheet 30 in FIG. 9.

The light control module MDL of the present embodiment differs from the first embodiment in the configuration of the first wire W1, the second wire W2, the second electrode 36, and the second substrate 38 of the light control sheet 30.

The first wire W1 of the light control sheet 30 is arranged along a long side of the first electrode 34. Although FIG. 9 does not illustrate the first electrode 34, the first electrode 34 has a substantially rectangular shape having a long side extending in the Y direction and a short side extending in the X direction and is arranged over almost an entire part of one surface of the first substrate 32.

The second electrode 36 and the second substrate 38 of the light control sheet 30 are separated into a plurality of strips by slits SL extending in the X direction. The light control sheet 30 of the present embodiment includes the plurality of second wires W2 which are electrically connected to the respective strips of the second electrode 36. The second wires W2 are each arranged along a long side of the light control sheet 30 facing the long side along which the first wire W1 is arranged. According to the present embodiment, therefore, a sum of a distance to the first wire W1 and a distance to the second wire W2 is the same at any position in the light control sheet 30.

That is, a supply voltage is applied to the first electrode 34 from one side in the X direction, and a supply voltage is applied to the second electrode 36 from the other side in the X direction. Thus, an effective voltage applied to the liquid crystal layer LQ, which is the light control layer, is approximately the same at any position in the X direction. Furthermore, when a supply voltage is applied, a voltage of the first wire W1 is approximately the same in the Y direction as that of the second wire W2. Accordingly, when the light control sheet 30 is driven, an effective voltage gradient is approximately zero in the plane direction of the light control sheet 30.

The light control module MDL of the present embodiment is similar to the first embodiment except for the above configuration of the light control sheet 30.

In the light control module MDL of the present embodiment, when a voltage achieving a linear transmittance (52.729%) equivalent to a Munsell value of 90% in the region close to the feeding position was applied so that the entire surface was in the transparent state, a voltage applied to the light control layer (liquid crystal layer LQ) in the region farthest from the feeding position was approximately equal to a voltage applied to the light control layer in the region close to the feeding position. Specifically, according to the light control module MDL of the present embodiment, a difference in the voltage applied to the light control layer (liquid crystal layer LQ) between the region close to the feeding position and the region farthest from the feeding position was 4.6 V or less, and the luminance was recognized to be uniform over the entire surface of the light control sheet 30. Furthermore, when the maximum transmittance of the light control module MDL was equivalent to a Munsell value of 100%, and a voltage was applied so that a transmittance equivalent to a Munsell value of 90% was obtained in the portion of the light control module MDL corresponding to the region of the light control sheet 30 closest to the feeding area applying a voltage to the light control layer, a transmittance higher than a transmittance equivalent to a Munsell value of 50% was obtained in the portion of the light control module MDL corresponding to the region of the light control sheet 30 farthest from the feeding area, and the luminance was recognized to be uniform over the entire surface of the light control sheet 30.

That is, the light control module MDL of the present embodiment yields an effect similar to that of the first embodiment and makes it possible to provide a light control module MDL which can be driven at a low voltage.

Figure 11A:
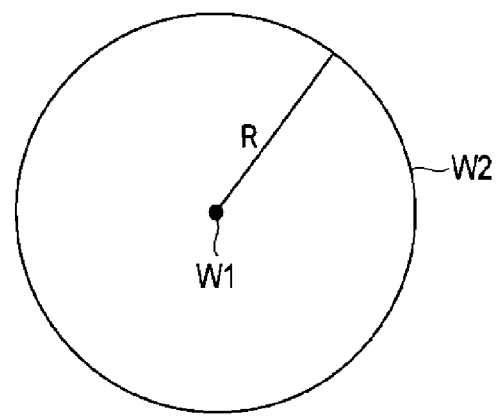
FIG. 11A illustrates an electrode structure of a light control sheet of a light control module.
Figure 11B:
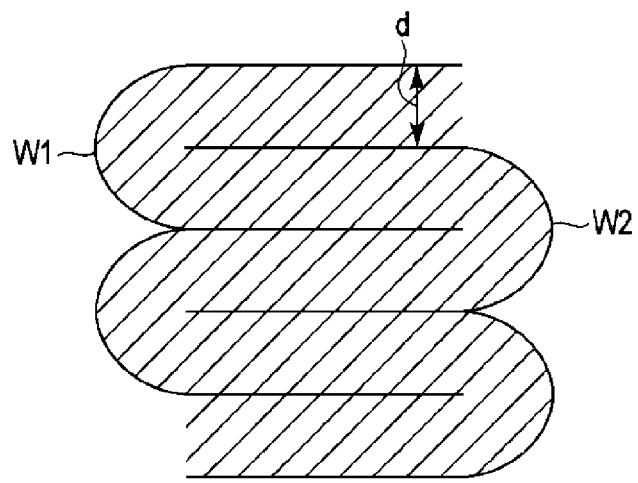
FIG. 11B illustrates an electrode structure of a light control sheet of a light control module.

FIGS. 11A and 11B are each a diagram illustrating an electrode structure of a light control sheet of a light control module.

According to the second embodiment described above, the first wire W1 and the second wire W2 are arranged along the respective facing long sides of the light control sheet 30. However, the first wire W1 and the second wire W2 are not limited to the configuration illustrated in FIGS. 9 and 10. The first wire W1 and the second wire W2 only need to be arranged so that the sum of the distance to the first wire W1 and the distance to the second wire W2 is the same at any position in the light control sheet 30.

For example, as illustrated in FIG. 11A, the second wire W2 may be arranged in a circular shape around the first wire W1. In this case, the sum of the distance to the first wire W1 and the distance to the second wire W2, which is a radius R, is the same at any position in the circle surrounded by the second wire W2.

For example, as illustrated in FIG. 11B, the first wire W1 and the second wire W2 may be arranged in substantially W-shapes facing each other. Also in this case, at any position in the light control sheet 30, the sum of the distance to the first wire W1 and the distance to the second wire W2 is the same as a space d between the first wire W1 and the second wire W2, and thus an effect similar to that of the second embodiment is yielded.

Third Embodiment

Figure 12:
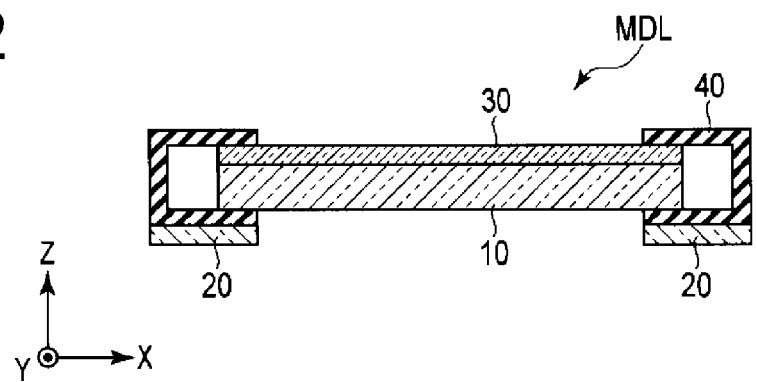
FIG. 12 schematically illustrates an example of a cross section of a light control module according to a third embodiment.

FIG. 12 is a diagram schematically illustrating an example of a cross section of the light control module MDL according to the third embodiment.

The light control module MDL of the present embodiment differs from the first embodiment in the configuration of the solar battery 20.

According to the present embodiment, the solar battery 20 is arranged on one surface substantially orthogonal to the lamination direction Z of the frame 40. Specifically, the solar battery 20 is arranged in a picture frame shape surrounding the transparent substrate 10 and the light control sheet 30. According to the present embodiment, the solar battery 20 is arranged on a surface of the frame 40 on a transparent substrate 10 side in the lamination direction Z, and the solar battery 20 converts light energy from sunlight or illumination light incident from the transparent substrate 10 side into electric energy, and outputs the electric energy. The frame 40 holds a periphery of the transparent substrate 10 and the light control sheet 30.

In the example illustrated in FIG. 12, the solar battery 20 is arranged on one surface substantially orthogonal to the lamination direction Z of the frame 40. However, another solar battery 20 may be arranged on the other surface substantially orthogonal to the lamination direction Z of the frame 40. In such a case, an area in which the solar battery 20 is arranged is ensured on both surfaces of the frame 40, leading to decrease in the width of the frame 40.

According to the first embodiment, the solar battery 20 is the translucent (transparent or semitransparent) photoelectric conversion section. According to the present embodiment, however, since the solar battery 20 is arranged on the frame 40, the solar battery 20 is not limited to the translucent photoelectric conversion section, and thus a solar battery having high energy conversion efficiency can be selected as the solar battery 20 of the present embodiment.

The light control module MDL of the present embodiment is similar to the first embodiment except for the above configuration. That is, the light control module MDL of the present embodiment yields an effect similar to that of the first embodiment.

The solar battery 20 does not need to be arranged over an entire surface of the frame 40 surrounding the transparent substrate 10 and the light control sheet 30. Depending on sunshine conditions and the like in a place where the light control module MDL is installed, the solar battery 20 may be arranged on a part of the surface substantially orthogonal to the lamination direction Z of the frame 40. Also in such a case, when a sufficient area is ensured in consideration of energy generated by the solar battery 20, an effect similar to that of the first embodiment is yielded. (Example 2)

A description will be given of an example of the light control module MDL of the third embodiment.

For example, the light control module MDL of the present example included the light control sheet 30 having a short side of 1000 mm and a long side of 1200 mm.

For example, when the light control sheet 30 was driven with a drive voltage of 100 V, power consumption of the light control sheet 30 was 11 W (=100 V×0.11 A). For example, when the drive voltage was reduced to 50 V, the drive voltage was half of the above measurement value, and the power consumption was 2.75 W (=11 W/4), which was a quarter of the measured power consumption.

For example, assume that the storage battery unit BT includes three lithium ion batteries in which a voltage is 4.1 V and an electric current is 1.8 Ah, and the light control sheet 30 is driven with electric power supplied from the storage battery unit BT. When the three lithium ion batteries are serially connected and fully charged, electric power stored in the lithium ion batteries is 22.14 Wh (=12.3 V×1.8 Ah). When the electric power stored in the lithium ion batteries is converted into AC power at an efficiency of 90%, electric power of 19.9 Wh (=22.14 Wh×0.9) is usable for driving the light control sheet 30.

Accordingly, when the light control sheet 30 is driven with a drive voltage of 50 V by using the three lithium ion batteries, the light control sheet 30 can be continuously driven for 7.23 h (=19.9 Wh/2.75 W).

For example, the present example employed, as the solar battery 20, a solar battery whose area was 180 mm×222 mm and whose main component was a single crystal silicon semiconductor. For example, in the solar battery 20, an output voltage was 9 V, an output current was 440 mA, and output power was approximately 4 W.

The area of the solar battery 20 is approximately 3.3% ((180×222)/(1000×1200)=0.033) of the area of the light control sheet 30. Accordingly, the area in which the solar battery 20 is arranged only needs to be 3.3% or more of the area of the light control sheet 30 to be driven.

As described above, according to the light control module MDL of the present example, an effect similar to that of the first embodiment was yielded, and by keeping the drive voltage of the light control module MDL low, the light control module MDL was able to be continuously driven for more than 7 hours with the electric power stored in the storage battery of the storage battery unit BT.

Fourth Embodiment

Figure 13:
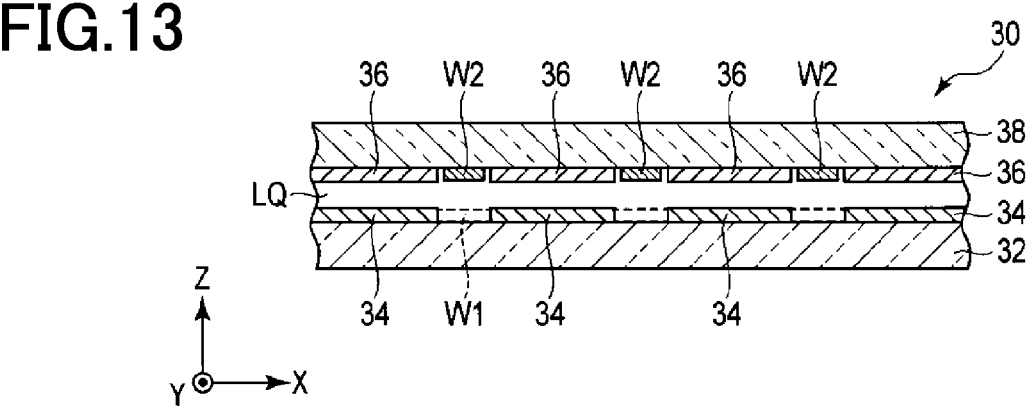
FIG. 13 is a cross-sectional view schematically illustrating a configuration of a light control sheet of a light control module according to a fourth embodiment.

FIG. 13 is a cross-sectional view schematically illustrating a configuration of the light control sheet 30 of the light control module MDL according to the fourth embodiment.

Figure 14:
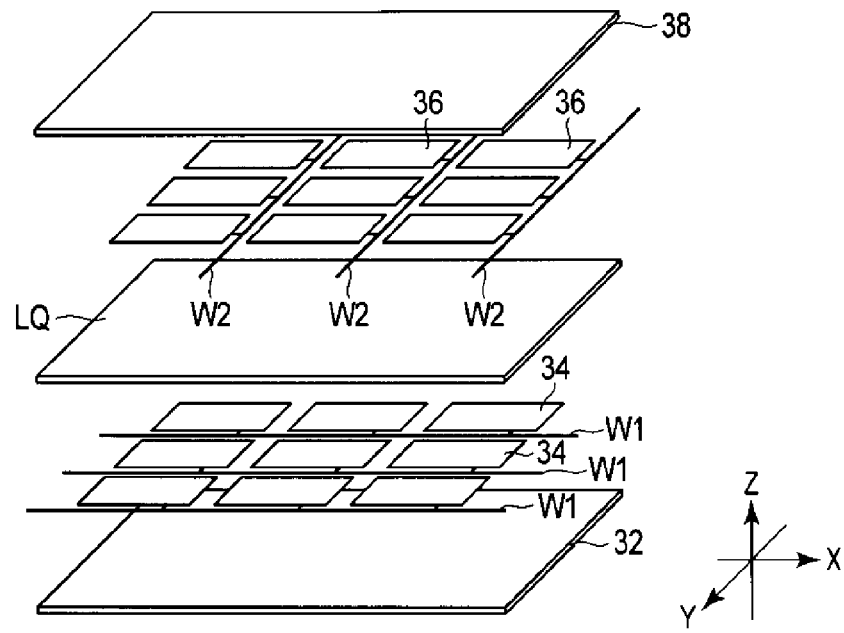
FIG. 14 is an exploded perspective view schematically illustrating the configuration of the light control sheet of the light control module according to the fourth embodiment.

FIG. 14 is an exploded perspective view schematically illustrating the configuration of the light control sheet 30 of the light control module MDL according to the fourth embodiment.

The light control module MDL of the present embodiment differs from the first embodiment in the configuration of the light control sheet 30.

The light control sheet 30 of the present embodiment includes the first substrate 32, the plurality of first electrodes 34, the plurality of first wires W1, the liquid crystal layer LQ, the plurality of second wires W2, the plurality of second electrodes 36, and the second substrate 38.

The first electrodes 34 are arranged in a matrix form in a plane direction substantially parallel to the first direction X and the second direction Y (on a virtual plane substantially orthogonal to the lamination direction Z) on a surface on the liquid crystal layer LQ side of the first substrate 32. The first electrodes 34 are each made of a transparent conductive material, such as ITO, IZO, or an organic conductive film, and have a thickness of approximately 80 nm or more and 150 nm or less.

The first wires W1 each extend in the first direction X between rows of the first electrodes 34 arranged adjacent to each other in the first direction X. The first wires W1 are insulated from each other.

The first wires W1 are each electrically connected to the first electrodes 34 arranged on one side in the second direction Y. Specifically, when a drive voltage is applied to one of the first wires W1, a drive voltage is applied to the first electrodes 34 in the row adjacent to the one of the first wires W1.

The second electrodes 36 are arranged in a matrix form so as to face the first electrodes 34 in a plane direction substantially parallel to the first direction X and the second direction Y (on a plane substantially parallel to the virtual plane on which the first electrodes 34 are arranged) on a surface on the liquid crystal layer LQ side of the second substrate 38. The second electrodes 36 are arranged at positions facing the respective first electrodes 34. The second electrodes 36 are each made of a transparent conductive material such as ITO or IZO and have, for example, a thickness of approximately 80 nm or more and 150 nm or less.

The second wires W2 each extend in the second direction Y between columns of the second electrodes 36 arranged adjacent to each other in the second direction Y. The second wires W2 are insulated from each other.

The second wires W2 are each electrically connected to the second electrodes 36 arranged on one side in the first direction X. Specifically, when a drive voltage is applied to one of the second wires W2, a drive voltage is applied to the second electrodes 36 in the column adjacent to the one of the second wires W2.

Figure 15:
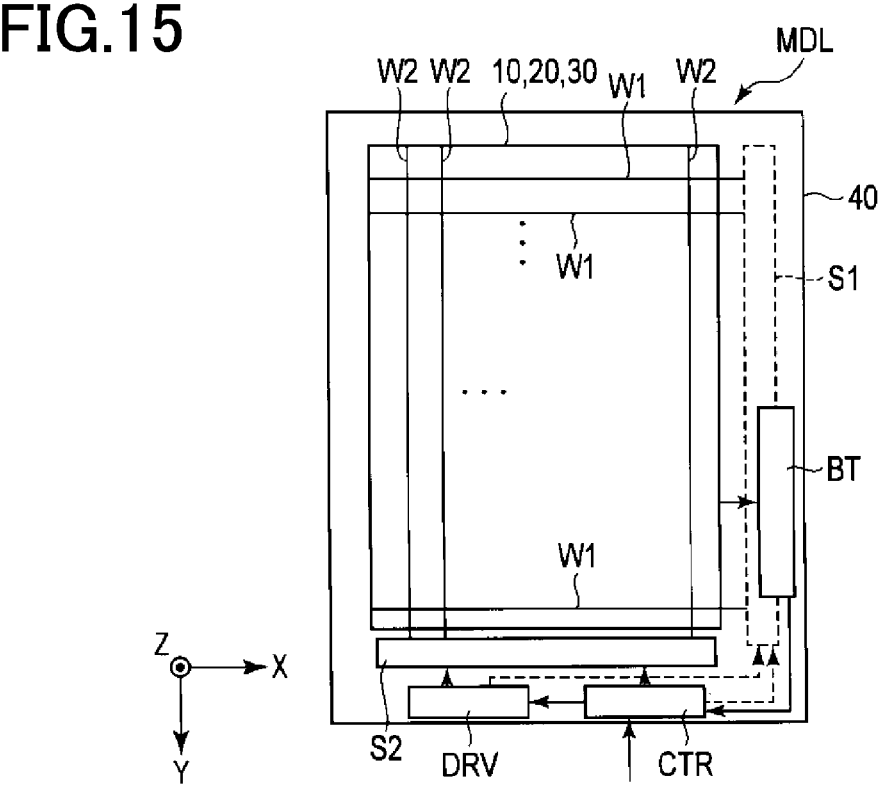
FIG. 15 is a block diagram schematically illustrating an example of a drive circuit of the light control module according to the fourth embodiment.

FIG. 15 is a block diagram schematically illustrating an example of a drive circuit of the light control module according to the fourth embodiment.

The light control module MDL of the present embodiment includes the controller CTR, the drive circuit DRV, the storage battery unit BT, and selectors S1 and S2. The controller CTR, the drive circuit DRV, the storage battery unit BT, and the selectors S1 and S2 are housed in a space inside the frame 40 of the light control module MDL.

For example, the controller CTR is an arithmetic circuit including a processor (not illustrated), such as a CPU or MPU, and a memory (not illustrated). The controller CTR can communicate with external devices, receive detection values or commands from various sensors, commands from interfaces such as user-operable remote controls, or the like, and control the drive circuit DRV and the selectors S1 and S2 based on the received commands or the like. The controller CTR controls the selectors S1 and S2 so that a part of the light control sheet 30 is in the transparent state or the opaque state.

The storage battery unit BT includes the storage battery BT of the first embodiment and the charge/discharge circuit CH. For example, the charge/discharge circuit CH controls a charging current of the storage battery BT according to a voltage or the like of the storage battery BT. Furthermore, based on a control signal from the control circuit CTR, the charge/discharge circuit CH discharges the storage battery BT and supplies a DC voltage to the drive circuit DRV. The charge/discharge circuit CH may be configured such that when the storage battery BT is fully charged, an output voltage of the solar battery 20 is outputted to the drive circuit DRV.

The drive circuit DRV includes a boost circuit and a frequency oscillator. The boost circuit boosts a voltage supplied from the storage battery according to a drive voltage of the light control sheet 30. The drive voltage of the light control sheet 30 is set by commands from the control circuit CTR. The frequency oscillator generates a frequency of the drive voltage of the light control sheet 30. The frequency of the drive voltage of the light control sheet 30 is set by commands from the control circuit CTR.

The operation of the selector S1 is controlled by the control circuit CTR so that one or more of the first wires W1 is selected and a drive voltage supplied from the drive circuit DRV is supplied to the selected one or more of the first wires W1.

The operation of the selector S2 is controlled by the control circuit CTR so that one or more of the second wires W2 is selected and a drive voltage supplied from the drive circuit DRV is supplied to the selected one or more of the second wires W2.

According to the present embodiment, the control circuit CTR, the drive circuit DRV, and the selectors S1 and S2 are mounted on a double-sided base plate, and the selector S1 is mounted on a surface different from a surface on which the control circuit CTR, the drive circuit DRV, and the selector S2 are mounted.

According to the light control module MDL of the present embodiment, the drive voltage of the light control sheet 30 can be kept low by separating the first electrodes 34 and the second electrodes 36 in the form of islands and driving the first electrodes 34 and the second electrodes 36 through the first wires W1 and the second wires W2, thus achieving lower power consumption of the light control module MDL. Accordingly, for example, the light control module MDL of the present embodiment is applicable when upsizing the light control module MDL. For example, the light control module MDL of the present embodiment can be configured by combining two or more of the light control sheets 30 of the light control modules MDL of the first to fourth embodiments. Also in such a case, power consumption of the light control module MDL can be kept low.

Furthermore, in the present embodiment, when the maximum transmittance of the light control module MDL was equivalent to a Munsell value of 100%, and a voltage was applied so that a transmittance equivalent to a Munsell value of 90% was obtained in the portion of the light control module MDL corresponding to the region of the light control sheet 30 closest to the feeding area applying a voltage to the light control layer, a transmittance higher than a transmittance equivalent to a Munsell value of 50% was obtained in the portion of the light control module MDL corresponding to the region of the light control sheet 30 farthest from the feeding area, and the luminance was recognized to be uniform over the entire surface of the light control sheet 30. In the light control module MDL of the present embodiment, the feeding area corresponds to the feeding position of each of the transparent electrodes.

That is, the present embodiment makes it possible to provide a light control module MDL which can be driven at a low voltage.

Furthermore, since the light control module MDL of the present embodiment can be driven with electric power supplied from the solar battery 20 and the storage battery unit BT, the light control module MDL of the present embodiment can be installed at a movable portion or a portion in which wiring is difficult. The light control module MDL of the present embodiment does not need to be fixed in real estate such as an architectural structure, and thus the light control module MDL is easily replaced when the operating life expires.

Furthermore, according to the light control module MDL of the present embodiment, a drive voltage can be selectively applied to the first electrodes 34 and the second electrodes 36. Specifically, a drive voltage can be applied only to the first electrode 34 and the second electrode 36 which are arranged at a position at which the selected first wire W1 intersects with the selected second wire W2, thus enabling a part of the light control sheet 30 to be switched between the transparent state and the opaque state.

Fifth Embodiment

Figure 16:
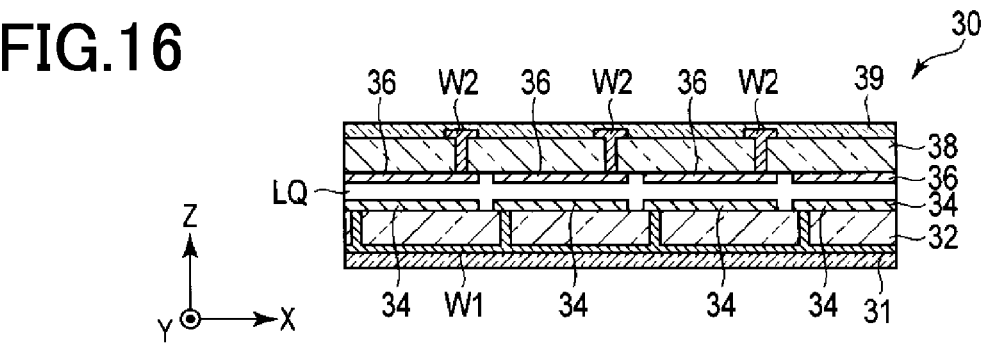
FIG. 16 is a cross-sectional view schematically illustrating a configuration of a light control sheet of a light control module according to a fifth embodiment.

FIG. 16 is a cross-sectional view schematically illustrating a configuration of the light control sheet 30 of the light control module MDL according to the fifth embodiment.

Figure 17:
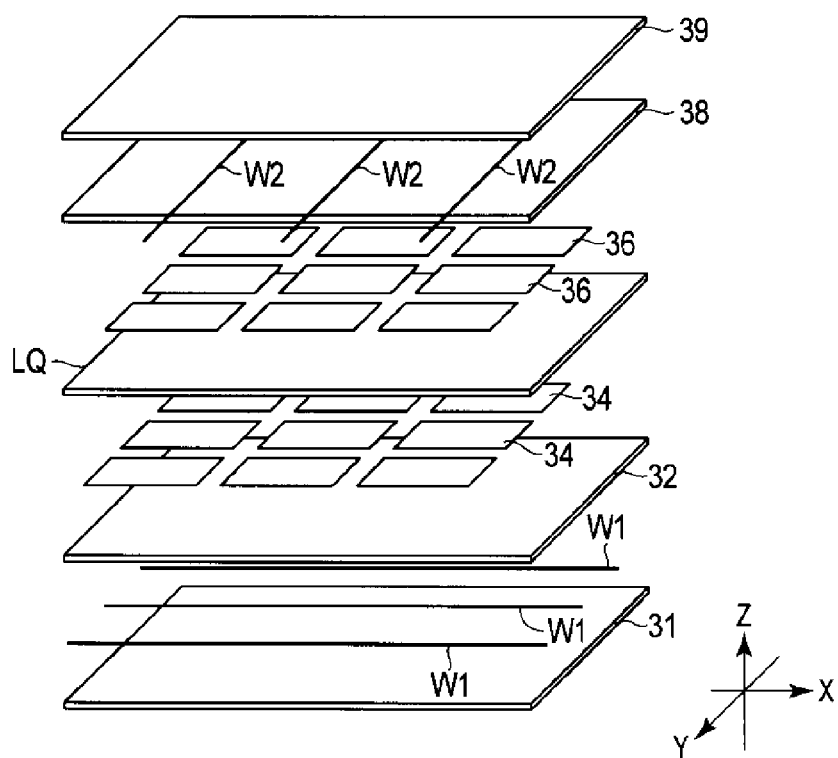
FIG. 17 is an exploded perspective view schematically illustrating the configuration of the light control sheet of the light control module according to the fifth embodiment.

FIG. 17 is an exploded perspective view schematically illustrating the configuration of the light control sheet 30 of the light control module MDL according to the fifth embodiment.

The light control module MDL of the present embodiment differs from the fourth embodiment described above in the configuration of the light control sheet 30.

The light control sheet 30 of the present embodiment includes a first protection layer 31, the first substrate 32, the plurality of first electrodes 34, the plurality of first wires W1, the liquid crystal layer LQ, the plurality of second wires W2, the plurality of second electrodes 36, the second substrate 38, and a second protection layer 39.

The first electrodes 34 are arranged in a matrix form in the first direction X and the second direction Y on a surface on the liquid crystal layer LQ side of the first substrate 32. The first electrodes 34 are each made of a transparent conductive material such as ITO, IZO, or an organic conductive film and have, for example, a thickness of approximately 80 nm or more and 150 nm or less.

The first wires W1 each extend in the first direction X on an outer surface of the first substrate 32. The first wires W1 are each arranged so as to face a row of the first electrodes 34 arranged adjacent to each other in the first direction X with the first substrate 32 therebetween. The first wires W1 are each electrically connected to the facing first electrodes 34 via through holes formed on the first substrate 32. The first wires W1 are insulated from each other. Specifically, when a drive voltage is applied to one of the first wires W1, a drive voltage is applied to the first electrodes 34 electrically connected to the one of the first wires W1.

The first protection layer 31 is arranged on the first wires W1. The first protection layer 31 is a transparent insulation layer and is, for example, made of PET.

The second electrodes 36 are arranged in a matrix form in the first direction X and the second direction Y on a surface on the liquid crystal layer LQ side of the second substrate 38. The second electrodes 36 are arranged at positions facing the respective first electrodes 34. The second electrodes 36 are each made of a transparent conductive material such as ITO or IZO and have, for example, a thickness of approximately 80 nm or more and 150 nm or less.

The second wires W2 each extend in the second direction Y on an outer surface of the second substrate 38. The second wires W2 are each arranged so as to face a column of the second electrodes 36 arranged adjacent to each other in the second direction Y with the second substrate 38 therebetween. The second wires W2 are each electrically connected to the facing second electrodes 36 via through holes formed on the second substrate 38. The second wires W2 are insulated from each other. Specifically, when a drive voltage is applied to one of the second wires W2, a drive voltage is applied to the second electrodes 36 electrically connected to the one of the second wires W2.

The second protection layer 39 is arranged on the second wires W2. The second protection layer 39 is a transparent insulation layer and is, for example, made of PET.

The light control module MDL of the present embodiment is similar to the fourth embodiment except for the above configuration of the light control sheet 30. According to the light control module MDL of the present embodiment, the drive voltage of the light control sheet 30 can be kept low by separating the first electrodes 34 and the second electrodes 36 in the form of islands and driving the first electrodes 34 and the second electrodes 36 through the first wires W1 and the second wires W2, thus achieving lower power consumption of the light control module MDL. Accordingly, for example, the light control module MDL of the present embodiment is applicable when upsizing the light control module MDL. For example, the light control module MDL of the present embodiment can be configured by combining two or more of the light control sheets 30 of the light control modules MDL of the first to fourth embodiments. Also in such a case, power consumption of the light control module MDL can be kept low.

Furthermore, in the present embodiment, when the maximum transmittance of the light control module MDL was equivalent to a Munsell value of 100%, and a voltage was applied so that a transmittance equivalent to a Munsell value of 90% was obtained in the portion of the light control module MDL corresponding to the region of the light control sheet 30 closest to the feeding area applying a voltage to the light control layer, a transmittance higher than a transmittance equivalent to a Munsell value of 50% was obtained in the portion of the light control module MDL corresponding to the region of the light control sheet 30 farthest from the feeding area, and the luminance was recognized to be uniform over the entire surface of the light control sheet 30. In the light control module MDL of the present embodiment, the feeding area corresponds to the feeding position of each of the transparent electrodes.

That is, the present embodiment makes it possible to provide a light control module MDL which can be driven at a low voltage.

Furthermore, since the light control module MDL of the present embodiment can be driven with electric power supplied from the solar battery 20 and the storage battery unit BT, the light control module MDL of the present embodiment can be installed at a movable portion or a portion in which wiring is difficult. The light control module MDL of the present embodiment does not need to be fixed in real estate such as an architectural structure, and thus the light control module MDL is easily replaced when the operating life expires.

Furthermore, according to the light control module MDL of the present embodiment, a drive voltage can be selectively applied to the first electrodes 34 and the second electrodes 36. Specifically, a drive voltage can be applied only to the first electrode 34 and the second electrode 36 which are arranged at a position at which the selected first wire W1 intersects with the selected second wire W2, thus enabling a part of the light control sheet 30 to be switched between the transparent state and the opaque state.

Although the several embodiments of the present invention have been described, the embodiments have been presented as examples and are not intended to limit the scope of the invention. These novel embodiments can be implemented in various other forms, and various omissions, substitutions, and changes can be made without departing from the gist of the invention. These embodiments and modifications thereof are included in the scope and gist of the invention and are included in the invention recited in the claims and the equivalent scope thereof.

Figure 19:
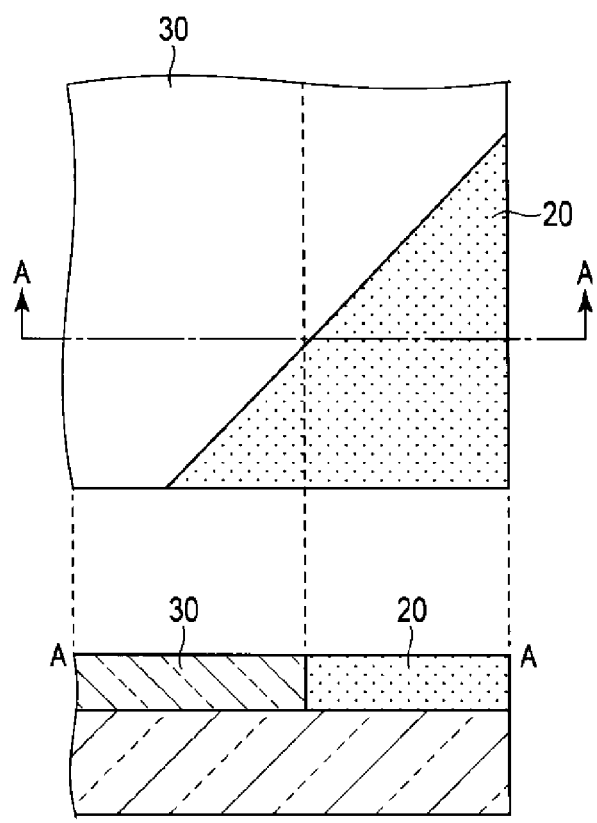
FIG. 19 illustrates an example of a configuration of a light control sheet and a solar battery of a light control module according to an embodiment.

FIG. 19 is a diagram illustrating an example of a configuration of a light control sheet and a solar battery of a light control module according to an embodiment.

In the embodiments described above, for example, the light control sheet 30 and the solar battery 20 may include a common substrate made of glass, an acrylic resin, a PET film, or the like. For example, as illustrated in FIG. 19, the light control sheet 30 may be a light control layer formed in a partial region on the common substrate, and the solar battery 20 may be a photoelectric conversion layer formed so as to be arranged adjacent to the light control layer of the light control sheet 30 in another region on the common substrate. In the example illustrated in FIG. 19, the common substrate has a substantially rectangular shape, and the solar battery 20 is arranged at a corner portion of the common substrate.

Alternatively, for example, the light control sheet 30 may be a light control layer formed on one surface of the common substrate, and the solar battery 20 may be a photoelectric conversion layer formed on the other surface of the common substrate. Also in this case, a transparent plate made of glass, an acrylic resin, or the like, or a transparent film such as a PET film can be used as the common substrate.

The solar battery 20 is preferably arranged in a portion irradiated with sunlight. The positions of the solar battery 20 and the light control sheet 30 and the area in which the solar battery 20 is arranged are preferably adjusted as appropriate according to the environment where the light control module is installed. A transmittance is uncontrollable in a region in which the solar battery 20 is arranged, and thus the positions of the solar battery 20 and the light control sheet 30 and the area in which the solar battery 20 is arranged are preferably adjusted as appropriate according to the usage of the light control module.

Figure 20:
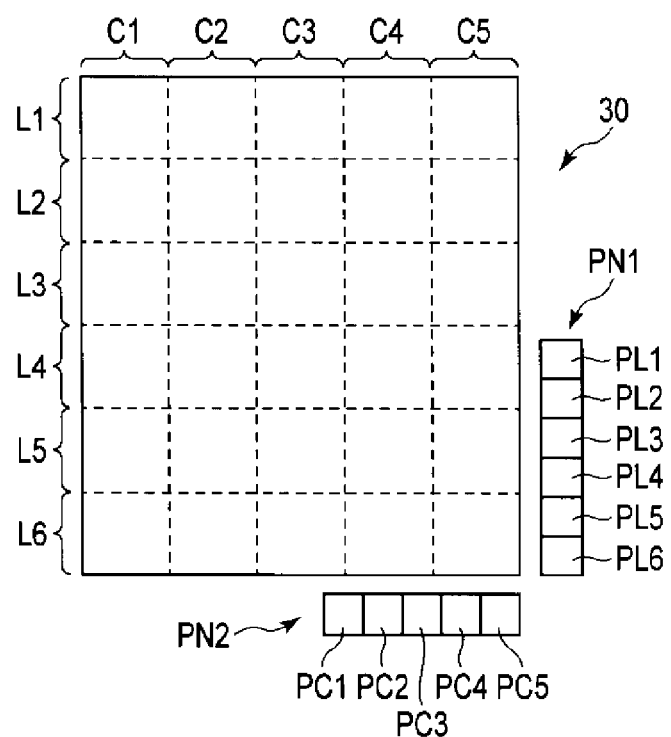
FIG. 20 is a diagram illustrating an example of an operation section of a light control module according to an embodiment.

FIG. 20 is a diagram illustrating an example of an operation section of a light control module according to an embodiment.

In the embodiments described above, for example, one of the first electrode 34 and the second electrode 36 of the light control sheet 30 may be divided into a plurality of regions L1 to L6 and C1 to C5 so that the regions L1 to L6 and C1 to C5 can be independently driven.

The operation section which operates a drive state of the regions L1 to L6 and C1 to C5 may be mounted in the frame 40 of the light control module MDL or outside the frame 40. For example, the operation section may be configured to include touch panels PN1 and PN2 corresponding to the regions of the light control sheet 30 and configured such that a drive state of each of the regions L1 to L6 and C1 to C5 of the light control sheet 30 is changeable by touching one of touch panels PL1 to PL6 and PC1 to PC5 corresponding to a region in which a transmittance (or luminance) is desired to be switched among the regions L1 to L6 and C1 to C5 of the light control sheet 30.

For example, by touching the touch panel PL1, a user can conduct an operation so that a transmittance (or luminance) in the region L1 of the light control sheet 30 is switched, and by touching the touch panel PC3, the user can conduct an operation so that a transmittance (or luminance) in the region C3 of the light control sheet 30 is switched. Furthermore, for example, by touching the touch panel PN1 successively from PL1 toward PL6 in a line, the user can conduct an operation so that a transmittance (or luminance) is continuously switched in the regions from the region L1 toward the region L6 of the light control sheet 30.

In any of the cases, an effect similar to that of the embodiments described above is yielded.

The present application addresses the following. When a transparent conductive film made of an Indium Tin Oxide (ITO), an Indium Zinc Oxide (IZO), an organic conductive film, or the like is used as an electrode of a light control sheet, wire resistance becomes high, and a voltage gradient occurs on the electrode surface. In order to drive a large-area light control sheet, therefore, a higher drive voltage has been required to reduce nonuniformity in transmittance.

Figure 18:
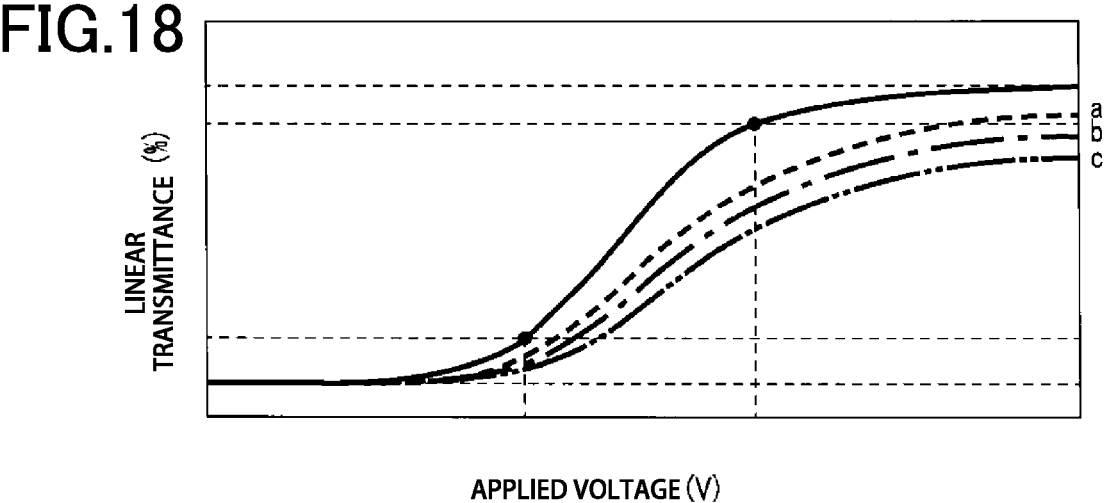
FIG. 18 shows an example of a linear transmittance value of a light control sheet relative to a voltage applied from one end of an electrode of the light control sheet for each distance from a feeding position.

FIG. 18 shows an example of a linear transmittance value of a light control sheet relative to a voltage applied from one end of an electrode of the light control sheet for each distance from a feeding position. In this example, the linear transmittance of the light control sheet changes in three levels including halftone (transparent, halftone, and whitish).

FIG. 18 shows, in a solid line, an example of a change in the linear transmittance relative to the applied voltage in a region of the light control sheet closest to the feeding position. In ascending order of a distance from the feeding position, dashed lines a, b, and c indicate examples of changes in the linear transmittance relative to the applied voltage in respective regions of the light control sheet.

According to the example shown in FIG. 18, the linear transmittance relative to the supply voltage is lower in a region farther from the feeding position in the light control sheet. This is because a wire resistance of a transparent conductive film causes a voltage drop, and thus a lower effective voltage is applied to a light control layer in the region farther from the feeding position.

As mentioned above, a high drive voltage is required to drive a large-area light control sheet so that all regions of the light control sheet are recognized to be transparent, and thus keeping drive power low has been difficult. Accordingly, for example, it has been difficult to drive the large-area light control sheet only with electric power from a solar battery. When a storage battery storing electric power from the solar battery is used, a storage battery having sufficient capacity needs to be mounted, which may increase the external dimensions or weight of an apparatus in which the light control sheet is mounted. Furthermore, it has been difficult to ensure uniformity in linear transmittance over an entire surface of the large-area light control sheet, and thus the quality of the light control module may be reduced.

When the light control sheet is connected to a fixed power source in order to ensure sufficient drive power source, wires are required for connection, and thus it has been difficult to enable the light control sheet to be movable. For example, it has been difficult to use the light control sheet as movable window glass or partitions.

When the thickness of the electrode is increased, a wire resistance is reduced, but the transmittance of the light control sheet is also reduced, and thus quality of the light control sheet is deteriorated.

The present invention has an aspect of providing a light control module including a light control sheet which reduces recognition of nonuniformity in transmittance.

A light control module according to an embodiment includes: a light control sheet including a light control layer which is switchable between the transparent state and the opaque state according to an applied voltage, at least one first electrode which is made of a transparent conductive material, and at least one second electrode which is arranged so as to face the at least one first electrode with the light control layer therebetween and is made of a transparent conductive material; and a drive circuit which applies a voltage to the at least one first electrode and the at least one second electrode of the light control sheet, wherein, when a maximum transmittance is equivalent to a Munsell value of 100%, and a voltage is applied so that a transmittance equivalent to a Munsell value of 90% is obtained in a region closest to a feeding area which applies a voltage to the at least one first electrode and the at least one second electrode, a transmittance higher than a transmittance equivalent to a Munsell value of 50% is obtained in a region farthest from the feeding area.

The light control sheet of the light control module according to an embodiment includes a first wire and a second wire, the first wire being electrically connected to the at least one first electrode and being made of a material whose electrical resistance is lower than that of the at least one first electrode, the second wire being electrically connected to the at least one second electrode and being made of a material whose electrical resistance is lower than that of the at least one second electrode.

In the light control module according to an embodiment, the first wire is arranged on the at least one first electrode and includes a plurality of first wire sections and a plurality of second wire sections, the first wire sections extending in a direction substantially parallel to a longitudinal direction of the at least one first electrode, the second wire sections extending in a direction substantially parallel to a width direction of the at least one first electrode and electrically connecting adjacent ones of the first wire sections; and the second wire is arranged on the at least one second electrode and includes a plurality of third wire sections and a plurality of fourth wire sections, the third wire sections extending in a direction substantially parallel to a longitudinal direction of the at least one second electrode, the fourth wire sections extending in a direction substantially parallel to a width direction of the at least one second electrode and electrically connecting adjacent ones of the third wire sections.

The light control module according to an embodiment further includes: a plurality of first wires; and a plurality of second wires, wherein the at least one first electrode includes a plurality of first electrodes; the at least one second electrode includes a plurality of second electrodes; the first electrodes are arranged in a matrix form on a virtual plane substantially orthogonal to a direction in which the light control sheet, the first electrodes, and the second electrodes are laminated; the second electrodes are arranged in a matrix form on a plane substantially parallel to the virtual plane so as to face the first electrodes; the first wires are electrically connected to the first electrodes arranged adjacent to each other in a first direction; and the second wires are electrically connected to the second electrodes arranged adjacent to each other in a second direction different from the first direction.

In the light control module according to an embodiment, the first wires each extend in the first direction between rows of the first electrodes arranged adjacent to each other in the first direction; and the second wires each extend in the second direction between columns of the second electrodes arranged adjacent to each other in the second direction.

The light control module according to an embodiment further includes: a first substrate which supports the first electrodes; and a second substrate which supports the second electrodes, wherein the first wires are each arranged so as to face a row of the first electrodes arranged adjacent to each other in the first direction with the first substrate therebetween and are electrically connected to the facing first electrodes via a through hole formed on the first substrate; and the second wires are each arranged so as to face a column of the second electrodes arranged adjacent to each other in the second direction with the second substrate therebetween and are electrically connected to the facing second electrodes via a through hole formed on the second substrate.

In the light control module according to an embodiment, the first wire and the second wire have a width of 20 μm or less.

In the light control module according to an embodiment, the light control layer is composed of a polymer dispersed liquid crystal or a polymer network liquid crystal.

In the light control module according to an embodiment, the first wire and the second wire include a copper wire.

The light control module according to an embodiment further includes: a storage battery which stores electric power to be supplied to the drive circuit; and a solar battery which supplies a charging current to the storage battery.

The light control module according to an embodiment further includes a transparent substrate which supports the light control sheet, wherein the solar battery is arranged on the transparent substrate and is transparent or semitransparent.

The light control module according to an embodiment further includes a transparent substrate which supports the light control sheet;

and a frame which holds a periphery of the light control sheet and the transparent substrate, wherein the solar battery is arranged on the frame.

An embodiment of the present invention is a light control module including a light control sheet which reduces recognition of nonuniformity in transmittance.

Obviously, numerous modifications and variations of the present invention are possible in light of the above teachings. It is therefore to be understood that within the scope of the appended claims, the invention may be practiced otherwise than as specifically described herein.

What is claimed is:

1. A light control module, comprising:
a light control sheet including a light control layer, at least one first electrode, and at least one second electrode facing the at least one first electrode with the light control layer formed therebetween; and
a drive circuit configured to apply a voltage to the at least one first electrode and the at least one second electrode, wherein
the light control layer is switchable between a transparent state and an opaque state according to an applied voltage, each of the at least one first electrode and the at least one second electrode comprises a transparent conductive material, the light control sheet has a feeding area for applying a voltage to the at least one first electrode and the at least one second electrode, and the light control sheet is formed such that when the light control sheet receives a voltage that causes a transmittance of the light control sheet to be equivalent to a Munsell value of 90% in a region closest to the feeding area, the light control sheet has a transmittance equivalent to a Munsell value of 50% in a region farthest from the feeding area, where a Munsell value of 100% is a maximum transmittance of the light control sheet,
the light control sheet includes a first wire and a second wire, the first wire being electrically connected to the at least one first electrode and the second wire being electrically connected to the at least one second electrode, and
the first wire is arranged so as to face a position on the at least one second electrode in which the second wire is not arranged.

2. The light control module of claim 1, wherein the first wire comprises a material whose electrical resistance is lower than electrical resistance of the at least one first electrode, and the second wire comprises a material whose electrical resistance is lower than electrical resistance of the at least one second electrode.

3. The light control module of claim 2, wherein the first wire is positioned on the at least one first electrode and includes a plurality of first wire sections and a plurality of second wire sections such that the first wire sections extend in a direction substantially parallel to a longitudinal direction of the at least one first electrode, and that the second wire sections extend in a direction substantially parallel to a width direction of the at least one first electrode and electrically connect adjacent ones of the first wire sections, and
the second wire is positioned on the at least one second electrode and includes a plurality of third wire sections and a plurality of fourth wire sections such that the third wire sections extend in a direction substantially parallel to a longitudinal direction of the at least one second electrode, and that the fourth wire sections extend in a direction substantially parallel to a width direction of the at least one second electrode and electrically connect adjacent ones of the third wire sections.

4. The light control module of claim 2, wherein the first wire and the second wire each have a width of 20 μm or less.

5. The light control module of claim 2, wherein the first wire and the second wire each include a copper wire.

6. The light control module of claim 2, further comprising:
a storage battery configured to store electric power to be supplied to the drive circuit; and
a solar battery configured to supply a charging current to the storage battery.

7. The light control module of claim 6, further comprising:
a transparent substrate configured to support the light control sheet,
wherein the solar battery is positioned on the transparent substrate and is transparent or semitransparent.

8. The light control module of claim 6, further comprising:
- a transparent substrate configured to support the light control sheet; and
- a frame configured to hold a periphery of the light control sheet and the transparent substrate,
- wherein the solar battery is positioned on the frame.

9. The light control module of claim 1, wherein
- the first wire comprises a plurality of first wires
- the second wire comprises a plurality of second wires,
- the at least one first electrode comprises a plurality of first electrodes,
- the at least one second electrode comprises a plurality of second electrodes,
- the first electrodes are positioned in a matrix form on a virtual plane substantially orthogonal to a direction in which the light control sheet, the first electrodes, and the second electrodes are positioned over one another,
- the second electrodes are positioned in a matrix form on a plane substantially parallel to the virtual plane such that the second electrodes face the first electrodes,
- the first wires are electrically connected to the first electrodes positioned adjacent to each other in a first direction, and
- the second wires are electrically connected to the second electrodes positioned adjacent to each other in a second direction different from the first direction.

10. The light control module of claim 9, wherein the first wires each extend in the first direction between rows of the first electrodes positioned adjacent to each other in the first direction, and
- the second wires each extend in the second direction between columns of the second electrodes positioned adjacent to each other in the second direction.

11. The light control module of claim 9, further comprising:
- a first substrate configured to support the first electrodes; and
- a second substrate configured to support the second electrodes,
- wherein the first wires each face a row of the first electrodes positioned adjacent to each other in the first direction with the first substrate therebetween and are electrically connected to the facing first electrodes via a through hole formed on the first substrate, and
- the second wires each face a column of the second electrodes arranged adjacent to each other in the second direction with the second substrate therebetween and are electrically connected to the facing second electrodes via a through hole formed on the second substrate.

12. The light control module of claim 9, further comprising:
- a storage battery configured to store electric power to be supplied to the drive circuit; and
- a solar battery configured to supply a charging current to the storage battery.

13. The light control module of claim 12, further comprising:
- a transparent substrate configured to support the light control sheet,
- wherein the solar battery is positioned on the transparent substrate and is transparent or semitransparent.

14. The light control module of claim 12, further comprising:
- a transparent substrate configured to support the light control sheet; and
- a frame configured to hold a periphery of the light control sheet and the transparent substrate,
- wherein the solar battery is positioned on the frame.

15. The light control module of claim 1, wherein the light control layer comprises a polymer dispersed liquid crystal or a polymer network liquid crystal.

16. The light control module of claim 1, further comprising:
- a storage battery configured to store electric power to be supplied to the drive circuit; and
- a solar battery configured to supply a charging current to the storage battery.

17. The light control module of claim 16, further comprising:
- a transparent substrate configured to support the light control sheet,
- wherein the solar battery is positioned on the transparent substrate and is transparent or semitransparent.

18. The light control module of claim 16, further comprising:
- a transparent substrate configured to support the light control sheet; and
- a frame configured to hold a periphery of the light control sheet and the transparent substrate,
- wherein the solar battery is positioned on the frame.

* * * * *